(12) United States Patent
Stoyanov et al.

(10) Patent No.: US 11,983,261 B2
(45) Date of Patent: May 14, 2024

(54) ENHANCE SINGLE SIGN-ON FLOW FOR SECURE COMPUTING RESOURCES

(71) Applicant: MICROSOFT TECHNOLOGY LICENSING, LLC, Redmond, WA (US)

(72) Inventors: Vladimir Kostadinov Stoyanov, Redmond, WA (US); Artem Belkine, Redmond, WA (US); Gustavo Hernando Catalano-Fonseca, Redmond, WA (US); Christian Cruz Montoya, San Diego, CA (US); David Belanger, Carnation, WA (US); Clark David Nicholson, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 260 days.

(21) Appl. No.: 17/239,354

(22) Filed: Apr. 23, 2021

(65) Prior Publication Data
US 2022/0342976 A1     Oct. 27, 2022

(51) Int. Cl.
G06F 21/41     (2013.01)
H04L 9/40      (2022.01)

(52) U.S. Cl.
CPC .......... *G06F 21/41* (2013.01); *H04L 63/0815* (2013.01); *H04L 63/0823* (2013.01); *H04L 63/083* (2013.01)

(58) Field of Classification Search
CPC ..... G06F 21/41; G06F 21/33; H04L 63/0815; H04L 63/0823; H04L 63/083; H04L 63/0807; H04L 63/33

(Continued)

(56) References Cited

U.S. PATENT DOCUMENTS 7,082,532 B1 *  7/2006  Vick ................... H04L 63/0815
                                                    713/157
10,659,450 B2   5/2020  Sridhar et al.
(Continued)

FOREIGN PATENT DOCUMENTS

EP          2862118 A1     4/2015

OTHER PUBLICATIONS

Sinha et al., 2020 IEEE 5th International Conference on Recent Trends on Electronics, Information, Communication & Technology, "Authorization Secured Dynamic Privileged Escalation", pp. 110-117. (Year: 2020).*

(Continued)

*Primary Examiner* — Khalil Naghdali
(74) *Attorney, Agent, or Firm* — Scott Y. Shigeta; Newport IP, LLC

(57) ABSTRACT

The techniques disclosed herein provide an enhanced single sign-on flow for secure computing resources, such as a virtual machine or hosted applications. In some configurations, the techniques process different types of security data, e.g., credentials, tokens, certificates, and reference objects at specific computing entities of a system to provide a single sign-on flow for providing access to secure computing resources from a client computing device. In one illustrative example, a select type of security data, such as a certificate, is generated from a token and a claim at a particular computing resource, such as an agent operating on a virtual machine. In another example, a signed version of the certificate can be stored and verified at the virtual machine. By generating certificates at such particular computing resources, the computing resource can verify a person's credentials using a secure single sign-on flow without requiring the person to provide credentials multiple times.

20 Claims, 16 Drawing Sheets

(58) Field of Classification Search
USPC .......................................................... 726/8
See application file for complete search history.

(56) References Cited

U.S. PATENT DOCUMENTS

| | | | |
|---|---|---|---|
| 10,798,084 B1 | 10/2020 | Rose et al. | |
| 11,503,012 B1* | 11/2022 | Yancey | H04L 63/102 |
| 11,616,780 B2* | 3/2023 | Zigman | G06F 21/335 |
| | | | 713/176 |
| 11,698,979 B2* | 7/2023 | Hamel | H04L 9/30 |
| | | | 713/193 |
| 2005/0160259 A1* | 7/2005 | Ogura | H04L 63/0823 |
| | | | 713/156 |
| 2013/0312079 A1* | 11/2013 | McCallum | G06F 21/335 |
| | | | 726/10 |
| 2018/0324172 A1* | 11/2018 | Unnikrishnan | H04L 63/102 |
| 2019/0334913 A1 | 10/2019 | Cicchitto | |
| 2019/0342280 A1 | 11/2019 | Shaw et al. | |
| 2020/0021574 A1 | 1/2020 | Pinner et al. | |
| 2020/0274900 A1 | 8/2020 | Vaishnavi | |
| 2022/0006800 A1* | 1/2022 | Duchastel | H04L 63/083 |

OTHER PUBLICATIONS

Brooks, Matthew, "Proof of Concept Guide: Microsoft Azure Active Directory Federated Authentication for Citrix Virtual Apps and Desktops with Citrix ADC", Retrieved from: https://docs.citrix.com/en-us/tech-zone/learn/poc-guides/cvad-azuread-federation.html, Oct. 22, 2020, 17 Pages.

Feller, Daniel, "Workspace—Single Sign-On", https://docs.citrix.com/en-us/tech-zone/learn/tech-briefs/workspace-sso.html, Oct. 22, 2020, 15 Pages.

"International Search Report and Written Opinion Issued in PCT Application No. PCT/US22/026038", dated Jul. 21, 2022, 27 Pages.

* cited by examiner

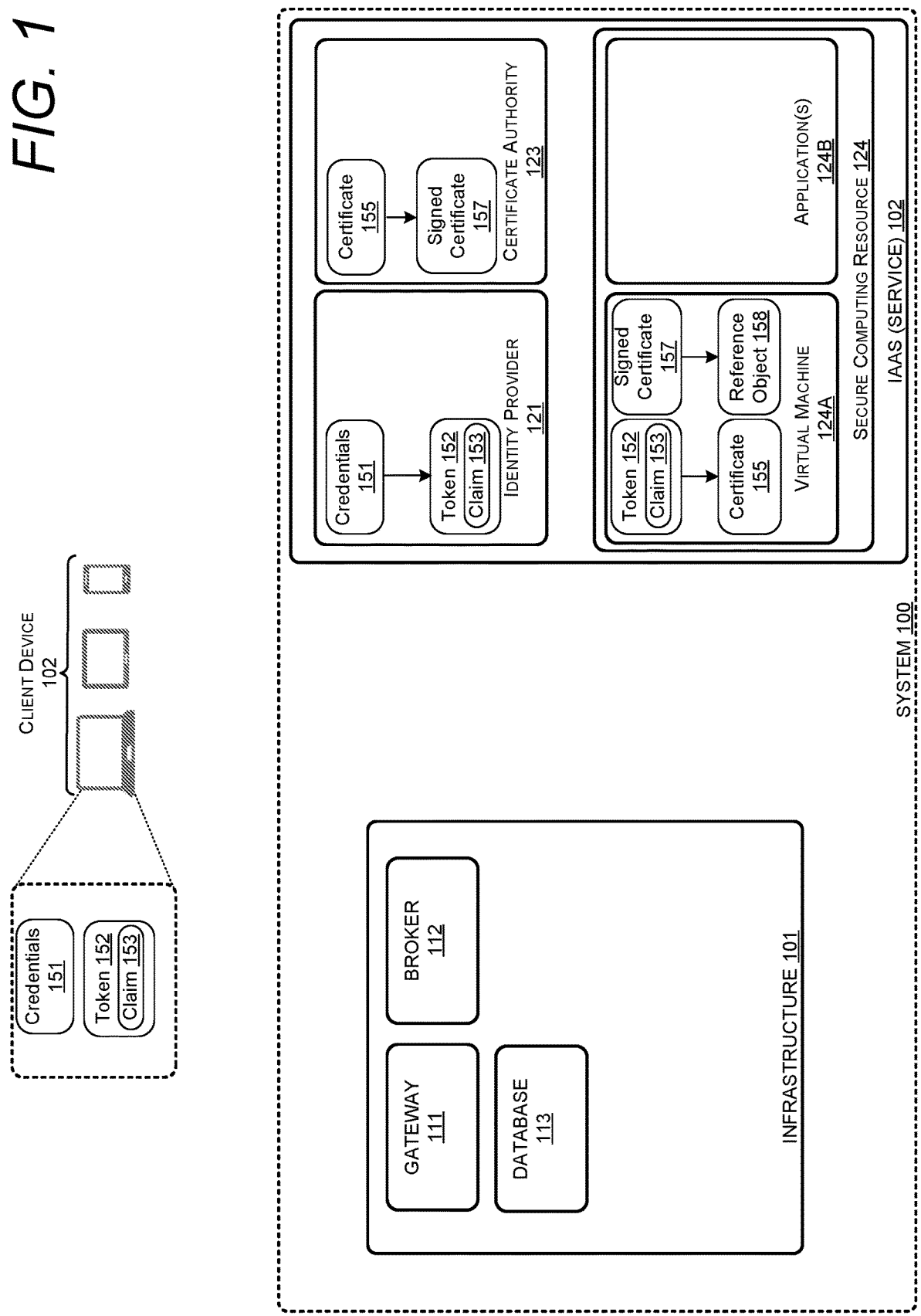

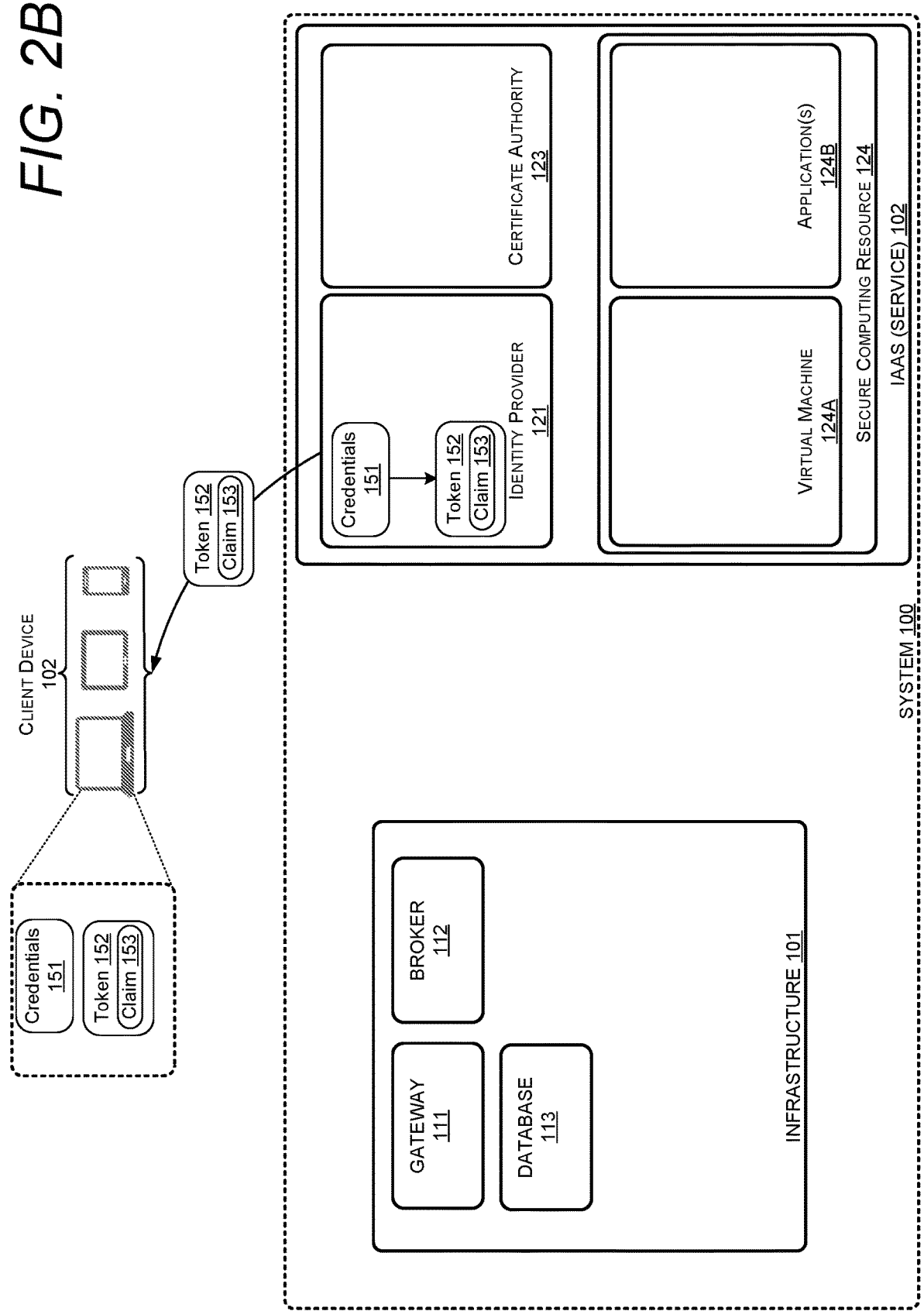

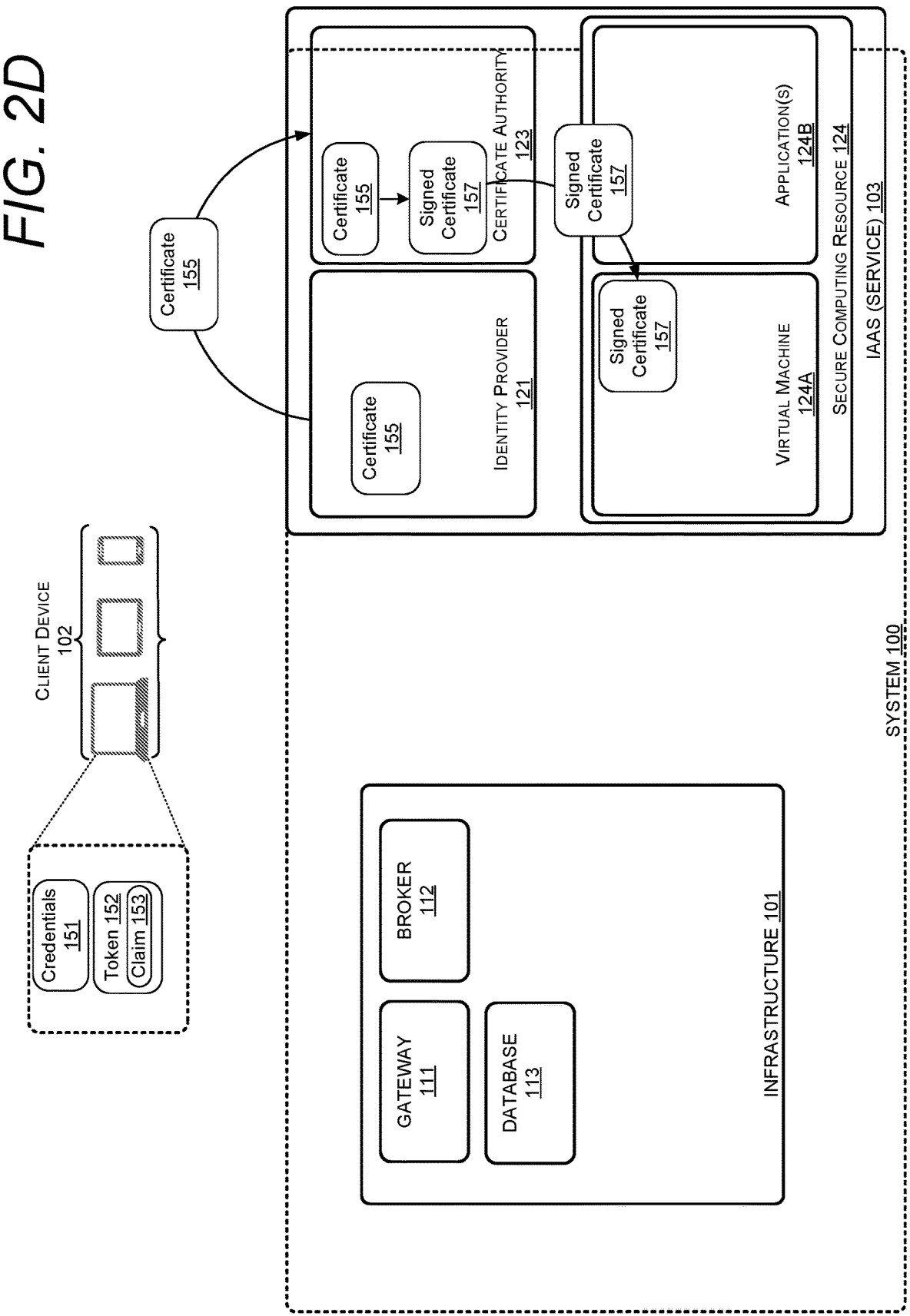

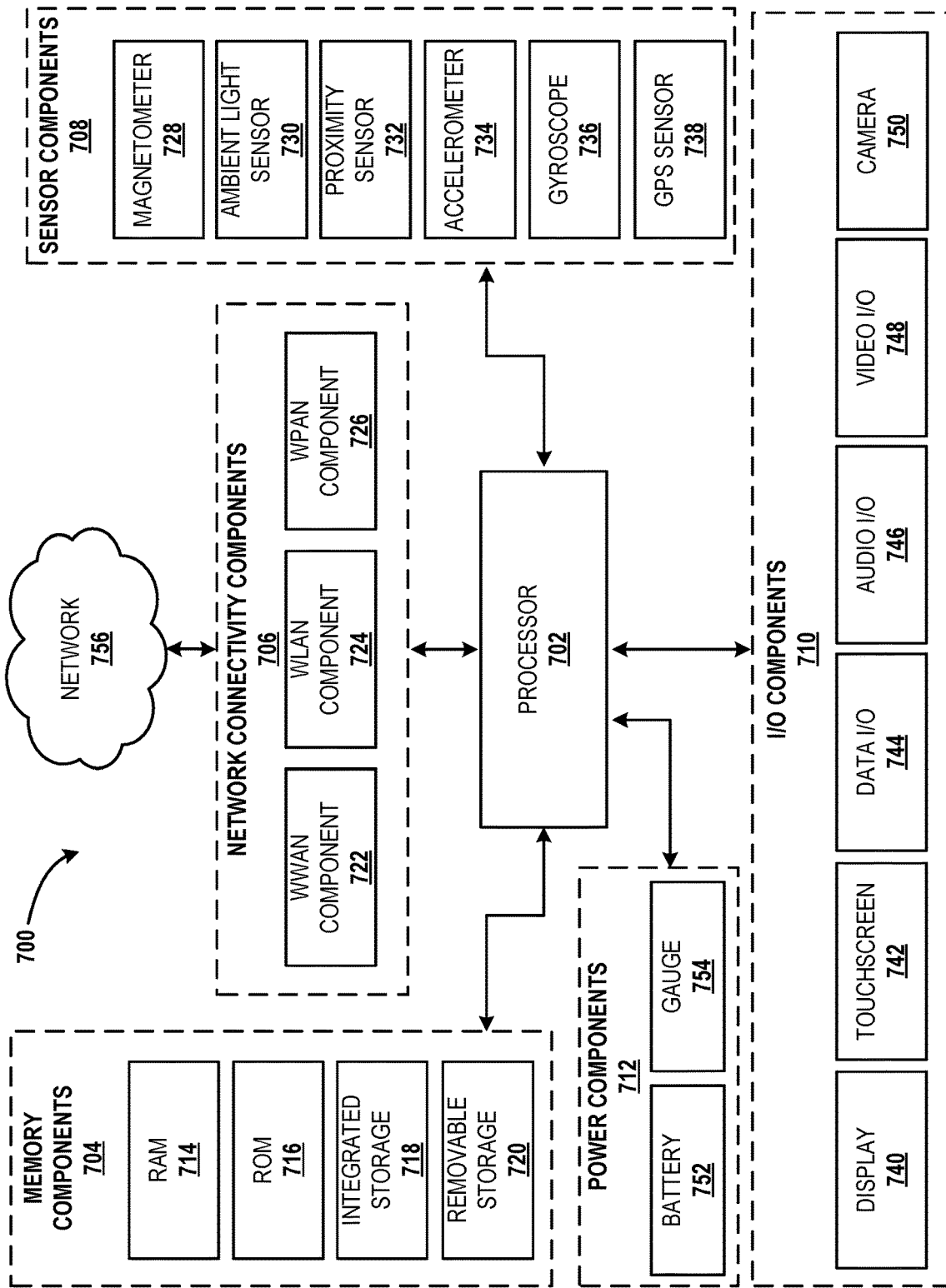

ENHANCE SINGLE SIGN-ON FLOW FOR SECURE COMPUTING RESOURCES

BACKGROUND

There are a number of different types of authentication systems that can use a person's electronic credentials to grant access to distinct systems or different levels of a distributed computing system. In some cases, an authentication system can grant access to virtual machines, server-based applications, and other services using just one set of credentials. Although there have been a number of developments in authentication systems, there still exist a number of scenarios that do not allow users to seamlessly use one set of credentials providing access to distinct systems or different levels of a distributed computing system.

In one illustrative example, when a person uses a client computing device to access virtual machines running on a server, the user may be required to perform a number of manual steps to provide credentials at multiple levels of a platform. First, a user may be required to login a client device which may require the user to provide their credentials, e.g., an identifier and password, a smart card, etc. Then, once the user is logged into the client device, the user may have to manually enter their credentials again to access services, such as virtual machines and application services, provided by a server. Such requirements cause a need for redundant manual entries, which can greatly hinder an adoption rate of a service in addition to exposing a system to increased security risks.

In some existing systems, a token can be used to grant access to a number of components of a computing system. In such systems, a token is generated when a user provides a set of credentials (herein referred to as "credentials") The token can be used to allow access to applications and other resources of a computing device. The token can also be duplicated to grant lower levels of access rights of an operating system. Despite the flexibility of existing systems, tokens cannot provide access to all aspects of a distributed computing system, such as a virtual machine executing on a remote server. Thus, the user experience can be negatively impacted by requiring users to re-enter their credentials when they attempt to access such resources.

It is with respect to these and other technical challenges that the disclosure made herein is presented.

SUMMARY

The techniques disclosed herein provide an enhanced single sign-on flow for secure computing resources, such as a virtual machine or hosted applications. In some configurations, the techniques process different types of security data, e.g., credentials, tokens, certificates, and reference objects at specific computing entities of a system to provide a single sign-on flow for providing access to secure computing resources from a client computing device. In one illustrative example, a select type of security data, such as a certificate, is generated from a token and a claim at a particular computing resource, such as an agent operating on a virtual machine. In another example, a signed version of the certificate can be stored and verified at the virtual machine. By generating certificates at such particular computing resources, the computing resource can verify a person's credentials using a secure single sign-on flow without requiring the person to provide credentials multiple times.

In one illustrative example, a system can generate a token when credentials are received at an identity provider. The token and a claim can be communicated to a particular computing resource, such as a virtual machine, where an agent on the virtual machine processes the token to generate a certificate. In response to a detection of one or more criteria, the certificate can be communicated to a certificate authority where the certificate can be signed. The signed certificate can then be communicated to a broker that routes the signed certificate to the computing resource where the agent can process the signed certificate into a security object. The security object can then be inserted into a connection between a client computing device and the computing resource for allowing secured access to the computing resource from the client computing device.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1 is a block diagram of a system for single sign-on flow for secure computing resources of an authentication system.

FIG. 2B illustrates aspects of a system for a single sign-on flow for secure computing resources in a second state of a process of the single sign-on flow of an authentication system.

FIG. 2D illustrates aspects of a system for a single sign-on flow for secure computing resources in a fourth state of a process of the single sign-on flow of an authentication system.

FIG. 7 is a computer architecture diagram illustrating a computing device architecture for a computing device capable of implementing aspects of the techniques and technologies presented herein.

DETAILED DESCRIPTION

Figure 2A:
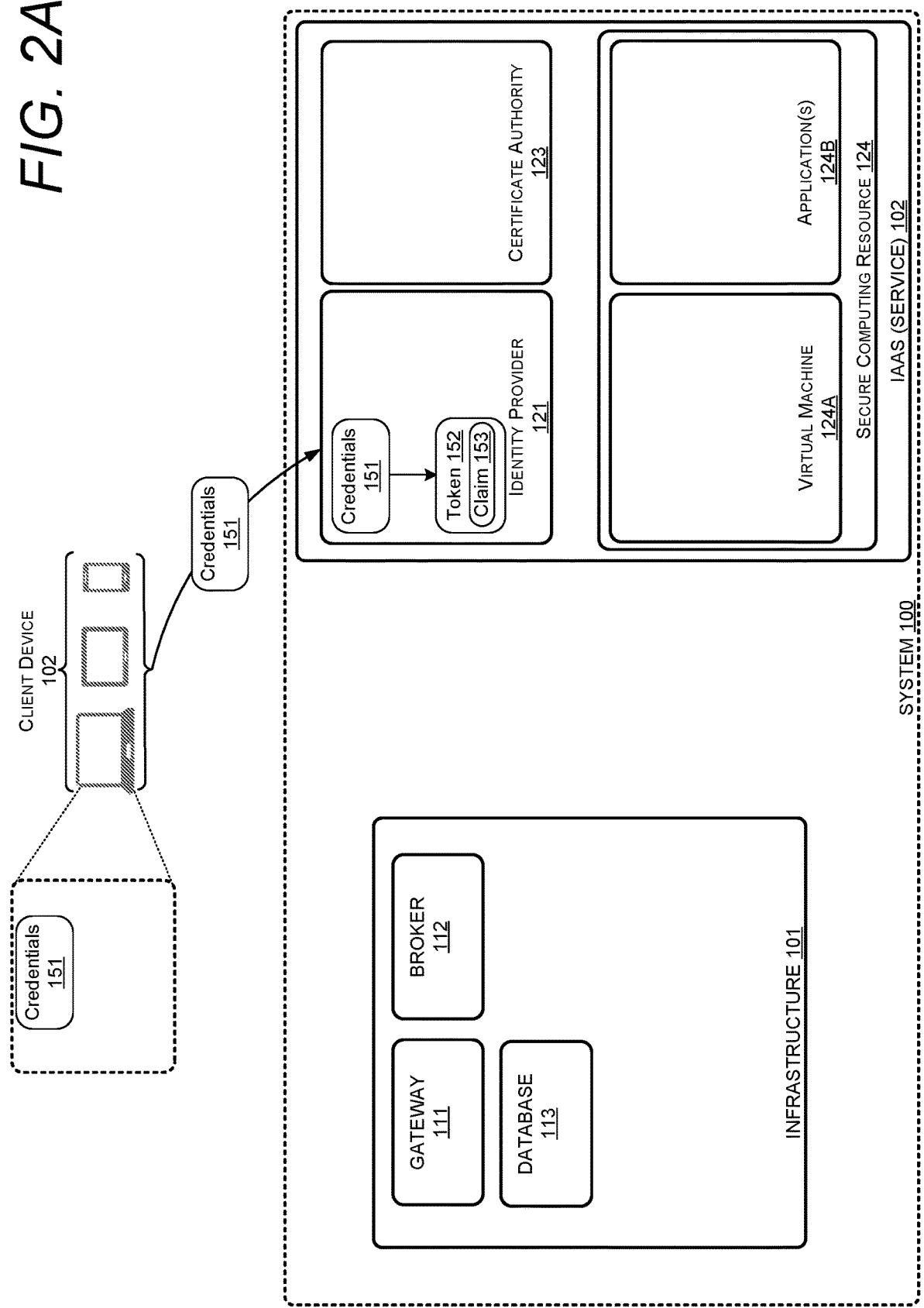
FIG. 2A illustrates aspects of a system for a single sign-on flow for secure computing resources in a first state of a process of the single sign-on flow of an authentication system.

The disclosed techniques improve the efficiency, security, and functionality of an authentication system by providing single sign-on flow access to secure computing resources, such as a virtual machine, a remote virtual machine, or a hosted application. The techniques disclosed herein process different types of security data, e.g., credentials, tokens, certificates, and reference objects at specific computing entities of a system to provide a single sign-on flow for providing access to secure computing resources from a client computing device. The disclosed techniques address several technical problems associated with some authentication systems. For example, the disclosed techniques address the problem of tokens not being able to provide access to all aspects of a distributed computing system, such as a virtual machine executing on a remote server. As described in more detail below, the disclosed techniques can also improve security by reducing the number of manual user inputs (i.e., hacker surface opportunities) required to gain access to a resource by employing the single sign-on flow authentication. The disclosed techniques can also save computing resources, such as processing cycles, memory resources, and networking resources, by only having to receive a single username and password input from a user in order to gain access to a remote virtual machine.

Traditionally, there are authentication systems where a user may have to enter a credential multiple times to gain access to a resource associated with the authentication system. For example, a user has to enter a username and password to gain access to the authentication system. The user then also has to re-enter the username and password to gain access to certain resources associated with the authentication system. The traditional method causes in-efficiencies of an authentication system by requiring a user to enter a credential multiple times to gain access to a resource. The traditional method also increases the security risk of an authentication system by increasing the number of user inputs (i.e., hacker surface opportunities) required to gain access to a resource. The traditional method also reduces the functionality of an authentication system by requiring a user to enter a credential multiple times to gain access to a resource.

The single sign-on flow features disclosed herein provide several benefits (e.g., technical effects) that improve the efficiency, security, and functionality of an authentication system by providing single sign-on flow access to secure computing resources. The disclosed techniques save computing resources of an authentication system, such as processing cycles, memory resources, and networking resources, by only having to receive a single username and password input from a user in order to gain access to a secure computing resource. The disclosed techniques also improve security of an authentication system by reducing the number of user inputs (i.e., hacker surface opportunities) required to gain access to a resource. The disclosed techniques also increase the efficiency and security of an authentication system by automating a user associated with a token access to a secure computing resource. FIGS. 1-7 illustrate an authentication system with single sign-on flow features and depicts various operating states of the single sign-on flow of the authentication system.

Referring now to FIG. 1, aspects of the single sign-on flow for secure computing resources of an authentication system features are shown and described below. FIG. 1 shows a system 100 comprising an infrastructure 101 and a service 103 for providing a single sign-on process between a secure computing resource 124, such as a virtual machine 124A or a hosted application 124B, and client device 102. The client device 102 can also be referred to as the "client," or the "client devices."

In general, the client device 102 can include computing devices. Examples of computing devices include a server computer, a mobile phone, a PDA, a smart phone, a desktop computer, a netbook computer, a tablet computer, and/or a laptop computer. The client device 102 can include an agent, where the agent allows the client device 102 to identify a remote computer, a virtual machine, or a computing device over a network connection. The agent also allows the client device 102 to identify an application on the computing device over a network connection.

The infrastructure 101 can include a gateway 111, a broker 112, and a database 113. In general, a gateway 111 can include a remote desktop gateway that provides a secure connection using the secure socket layer protocol to the server via a remote desktop protocol. In general, a broker 112 can include a remote desktop broker. A remote desktop broker is software that allows the client device 102 to access various types of server-hosted desktops and applications. In general, a database 113 can include user information, such as user configuration data. For instance, when a user wants to access a secure computing resource 124, they may provide information at a configuration stage. A user may indicate a specific identity provider or a certificate authority they prefer. In such a process, the database 113 can store those preferences as well as network addresses for each preferred resource and address information for the clients.

The service 103 can include an infrastructure as a service (IaaS). In general, the IaaS can include online services that provide high-level APIs used to dereference various lowlevel details of underlying network infrastructure like physical computing resources, location, data partitioning, scaling, security, backup etc. A hypervisor, such as Xen, Oracle VirtualBox, Oracle VM, KVM, VMware ESX/ESXi, or Hyper-V, LXD, runs the virtual machines as guests. Pools of hypervisors within the cloud operational system can support large numbers of virtual machines and the ability to scale services up and down according to customers' varying requirements.

The service 103 can include a secure computing resource 124, which can be a virtual machine 124A, applications 124B, or other computing resources for processing or storing data. A virtual machine 124A can include an instance of an operating system executing within a secured environment that is separated from other operating system instances executing within other secured environments. The Applications 124B can include applications executing on the service, such as a calendar application, a word processing application, etc.

The service 103 can include an identity provider 121. In general, the identity provider 121 can include an Active Directory Federation Services Server (ADFS). The ADFS can provide users with single sign-on access to some systems and to some applications located across organizational boundaries. The ADFS can use federated identity to link users across multiple identity management systems.

The service 103 can include access to a certificate authority 123. The certificate authority 123 can be accessed locally or remotely. In general, a certificate authority 123 is an entity that issues digital certificates. A signed certificate 157 is an example of a digital certificate. A digital certificate certifies the validity of the information in a certificate. For example, the information could be the username of a credentials 151 or the username and password of a credentials 151, or any other type of credential. A digital certificate can also certify the ownership of a public key by the named subject of the certificate. This allows others, relying parties, to rely upon signatures or on assertions made about the private key that corresponds to the certified public key. A certificate authority 123 acts as a trusted third party trusted both by the subject, owner, of the certificate and by the party relying upon the certificate.

As shown in FIG. 2A, in a first stage of a single sign-on process, receiving, at an identity provider 121, a set of credentials 151 from a client device 102. The credentials 151 from a client device 102 are communicated to an identity provider 121. In general, the credentials 151 identify the user of the client device 102 to the identity provider 121. The credentials 151 can include a username and a password.

The first stage can also include generating a token 152 indicating validity of the set of credentials 151 in response to determining that the set of credentials 151 meets one or more criteria, the token 152 defining a claim 153 for a single sign-on flow for a user associated with the set of credentials 151. In an implementation, the identity provider 121 can generate a token 152 and a claim 153 associated with the credentials 151. The claim 153 is included within the token 152. A token 152 can be an alphanumeric string used in token-based authentication. For example, a user can authenticate with a username and password once and then receive a token 152 in return. The received token 152 can then be used thereafter to represent the user when authenticating to some resources.

A claim 153 can provide information about the credentials 151. For example, the claim 153 can include the username or the username and password of the credentials 151. The claim 153 can also inform the identity provider 121 that the token 152 has logged into or has communicated with the identity provider 121 during a previous communication. The claim 153 can also inform the identity provider 121 that because the token 152 has logged into or has communicated with the identity provider 121 in the past, the token 152 can be exchanged for a login certificate. A certificate 155 can also be referred to as a login certificate.

Referring now to FIG. 2B, in a second stage of a single sign-on process, communicating the token 152 to the client device 102, wherein the client device 102 is configured to communicate the token 152 with a request 154 to initiate the single sign-on flow for accessing a secure computing resource 124 of a service 103. In an implementation, the token 152 and the claim 153 are communicated to the client device 102. The communication to the client device 102 can also include communicating identified resources associated with the token 152.

Figure 2C:
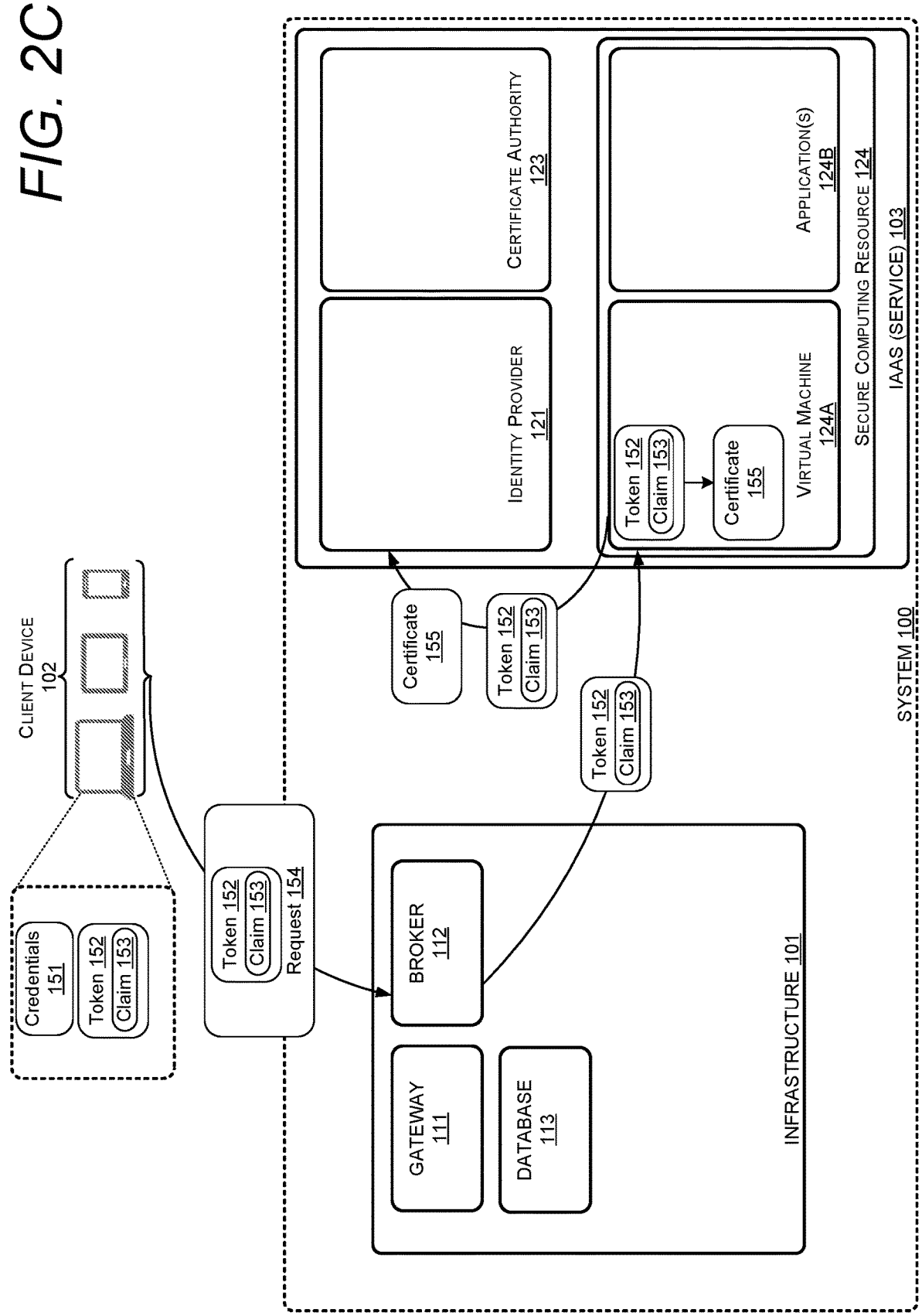
FIG. 2C illustrates aspects of a system for a single sign-on flow for secure computing resources in a third state of a process of the single sign-on flow of an authentication system.

Referring now to FIG. 2C, in a third stage of a single sign-on process, receiving, at a broker 112, the request 154 from the client device 102 for access to the secure computing resource 124 of the service 103, wherein the request 154 comprises the token 152 that defines the claim 153 for the single sign-on flow. In some implementations, a client device 102 makes a request 154 through a broker 112 to access a secure computing resource 124 associated with a token 152. In some implementations, receiving the request 154 can also initiate receiving a predetermined location to where to route a request to initiate getting a certificate 155 signed is sent. For example, the URL of the identity provider 121 can be provided as the location to send the request to initiate getting a certificate 155 signed. The predetermined location can be provided by a user, an internal source, or an external source.

The third stage can also in response to determining that the request 154 comprises the token 152 and the claim 153 generated by the identity provider 121, causing the secure computing resource 124 to generate a certificate 155 from the token 152, wherein the secure computing resource 124 is configured to communicate the certificate 155 and the token 152 to the identity provider 121. In some implementations, the request 154 through the broker 112 may causes the secure computing resource 124 to generate the certificate 155 based on the claim 153. The claim can provide an entity of the certificate 155. The certificate 155 can provide identifying information about an entity. For example, the certificate 155 can provide information that the entity is a username or a username and password from the credentials 151. The generation of the certificate 155 can cause the certificate 155, the token 152, and the claim 153 to be communicated to the identity provider 121. The identity provider 121 can be predetermined by the customer. The identity provider 121 can also register the identity provider 121 to be able to request a signed certificate on behalf of a user ID based on a token 152.

Referring now to FIG. 2D, in a fourth stage of a single sign-on process, causing the identity provider 121 to verify the token 152 and to send the certificate 155 to a certificate authority 123 to generate a signed certificate 157 from the certificate 155, wherein the certificate authority 123 comprises security data provided by the user to sign the certificate 155. In an implementation, the identity provider 121 validates the token 152. Upon successful validation of the token 152, the certificate 155 is communicated to a certificate authority 123. The certificate authority 123 validates the certificate 155 and generates a signed certificate 157. The signed certificate 157 is communicated to the secure computing resource 124.

Figure 2E:
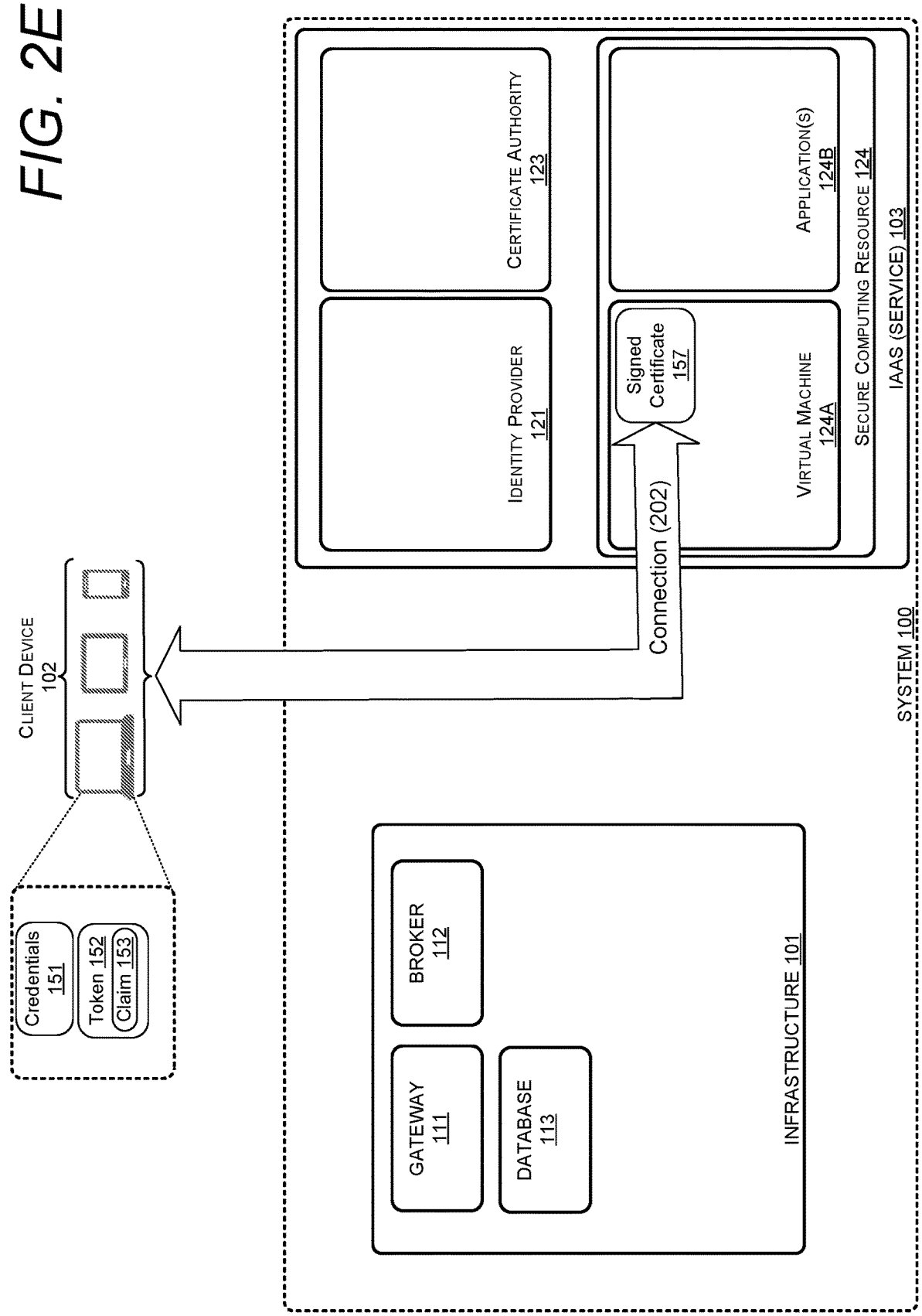
FIG. 2E illustrates aspects of a system for a single sign-on flow for secure computing resources in a fifth state of a process of the single sign-on flow of an authentication system.

Referring now to FIG. 2E, in a fifth stage of a single sign-on process, sending the signed certificate 157 to the secure computing resource 124, where the signed certificate 157 enables the client device 102 to access the secure computing resource 124 through a connection 202 without requiring the client device 102 to resubmit the set of credentials 151 for accessing the secure computing resource 124. In an implementation, the signed certificate 157 is inserted into a connection 202. The connection 202 enables a communication between the secure computing resource 124 and the client device 102. For example, the connection 202 can be a secure encrypted connection between the secure computing resource 124 and the client device 102. The insertion of the signed certificate 157 into the connection 202 enables the client device 102 to access the secure computing resource 124 through the connection 202 without requiring the client device 102 to resubmit the credentials 151 for accessing the secure computing resource 124.

Referring now to an alternative embodiment of aspects of the single sign-on flow for secure computing resources of an authentication system features are shown and describe below. FIGS. 3A-3F show an embodiment of a single sign-on flow that may be used in a multi-tenant system, in which case the use of a reference object may be used to establish a connection.

Figure 3A:
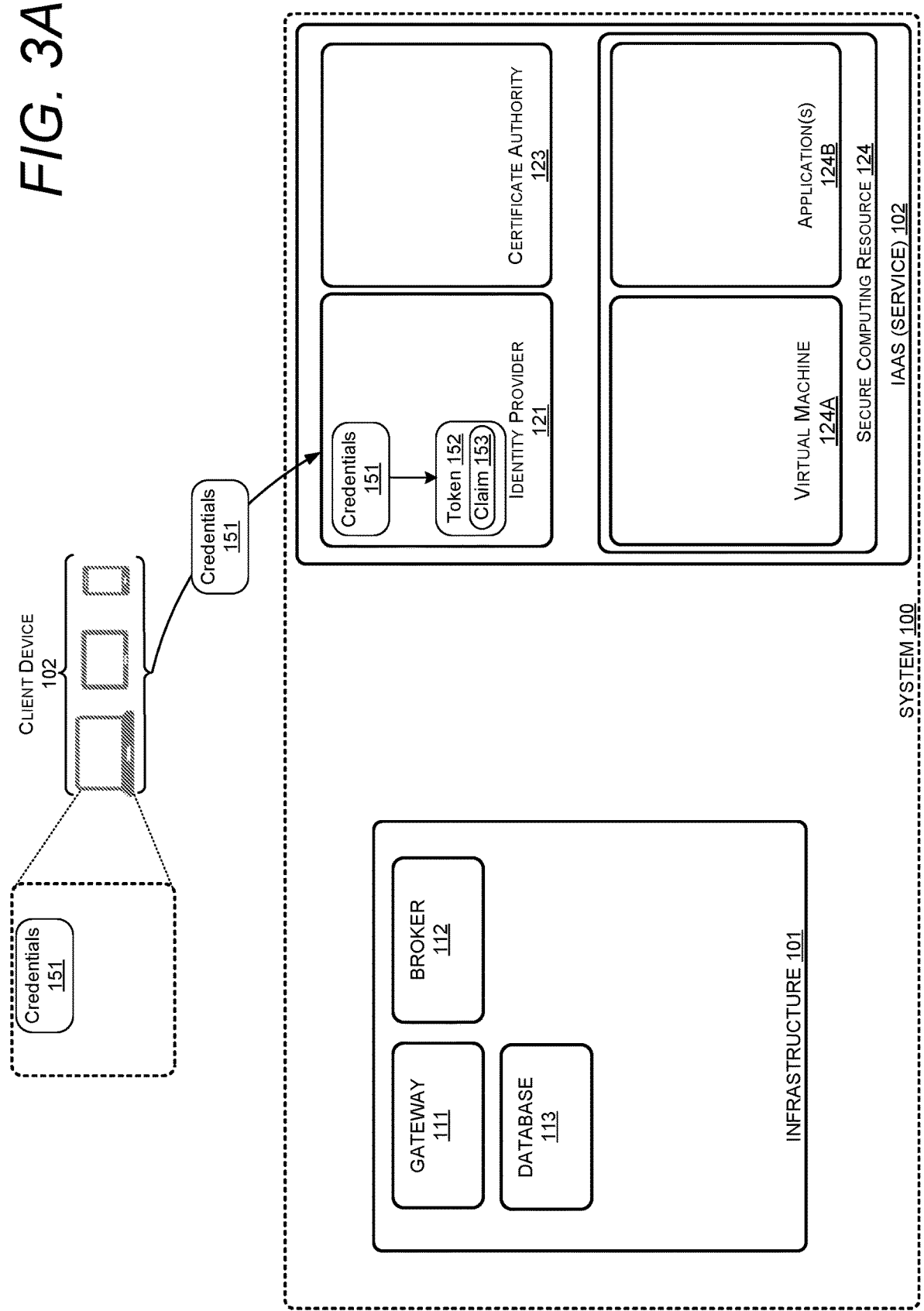
FIG. 3A illustrates aspects of a system for a single sign-on flow using a reference object for secure computing resources in a first state of a process of the single sign-on flow of an authentication system.

As shown in FIG. 3A, in a first stage of a single sign-on process, receiving, at an identity provider 121, a set of credentials 151 from a client device 102. The credentials 151 from a client device 102 are communicated to an identity provider 121. The credentials 151 identify the user of the client device 102 to the identity provider 121. The credentials 151 can include a username and a password.

The first stage can also include generating a token 152 indicating validity of the set of credentials 151 in response to determining that the set of credentials 151 meets one or more criteria, the token 152 defining a claim 153 for a single sign-on flow for a user associated with the set of credentials 151. In an implementation, the identity provider 121 can generate a token 152 and a claim 153 associated with the credentials 151. The claim 153 is included within the token 152. A token 152 can be an alphanumeric string used in token-based authentication. For example, a user can authenticate with a username and password once and then receive a token 152 in return. The received token 152 can then be used thereafter to represent the user when authenticating to some resources.

A claim 153 can provide information about the credentials 151. For example, the claim 153 can include the username or the username and the password of the credentials 151. The claim 153 can also inform the identity provider 121 that the token 152 has logged into or has communicated with the identity provider 121 during a previous communication. The claim 153 can also inform the identity provider 121 that because the token 152 has logged into or has communicated with the identity provider 121 in the past, the token 152 can be exchanged for a login certificate. A certificate 155 can also be referred to as a login certificate.

Figure 3B:
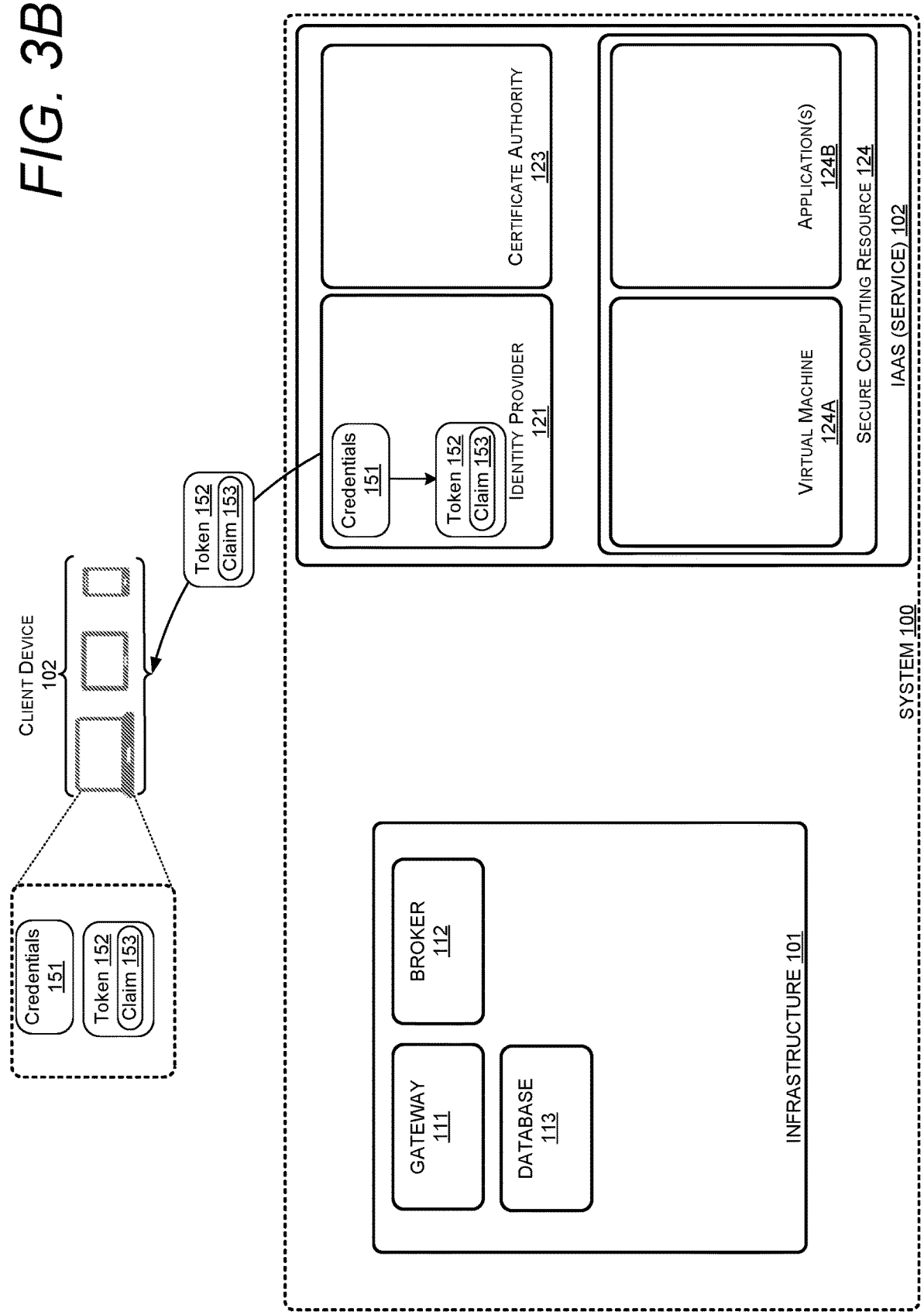
FIG. 3B illustrates aspects of a system for a single sign-on flow using a reference object for secure computing resources in a second state of a process of the single sign-on flow of an authentication system.

Referring now to FIG. 3B, in a second stage of a single sign-on process, communicating the token 152 to the client device 102, wherein the client device 102 is configured to communicate the token 152 with a request 154 to initiate the single sign-on flow for accessing a secure computing resource 124 of a service 103. In an implementation, the token 152 and the claim 153 are communicated to the client device 102. The communication to the client device 102 also can include communicating identified resources associated with the token 152.

Figure 3C:
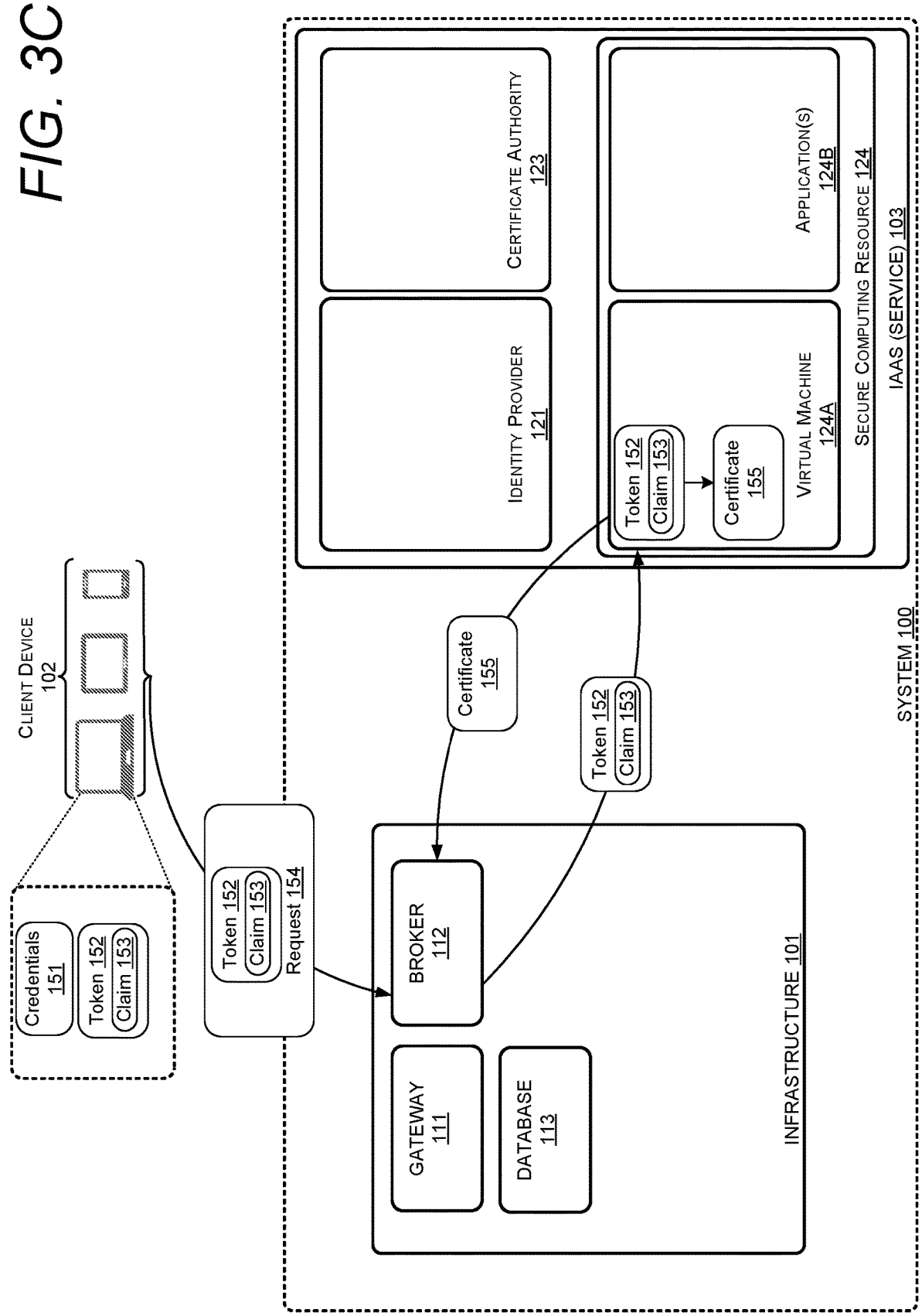
FIG. 3C illustrates aspects of a system for a single sign-on flow using a reference object for secure computing resources in a third state of a process of the single sign-on flow of an authentication system.

Referring now to FIG. 3C, in a third stage of a single sign-on process, receiving, at a broker 112, the request 154 from the client device 102 for access to the secure computing resource 124 of the service 103, wherein the request 154 comprises the token 152 that defines the claim 153 for the single sign-on flow. In some implementations, a client device 102 makes a request 154 through a broker 112 to access a secure computing resource 124 associated with a token 152. In some implementations, receiving the request 154 can also initiate receiving a predetermined location to where to route a request to initiate getting a certificate 155 signed is sent. For example, the URL of the identity provider 121 can be provided as the location to send the request to initiate getting a certificate 155 signed. The predetermined location can be provided by a user, an internal source, or an external source.

The third stage can also in response to determining that the request 154 comprises the token 152 and the claim 153 generated by the identity provider 121, causing the secure computing resource 124 to generate a certificate 155 from the token 152, wherein the secure computing resource 124 is configured to communicate the certificate 155 to a broker 112. In an implementation, the request 154 through the broker 112 causes the secure computing resource 124 to generate the certificate 155 based on the claim 153. The claim can provide an entity of the certificate 155. The certificate 155 can provide identifying information about an entity. For example, the certificate 155 can provide information that the entity is a username or a username and password from the credentials 151.

In an implementation, the generation of the certificate 155 causes the certificate 155, the token 152, and the claim 153 to be communicated back to the broker 112. The communication through the broker 112 can be used when the system is supporting a multi-tenant cloud (Not shown). A multi-tenant cloud is a cloud computing architecture that allows customers to share computing resources in a public or private cloud. Each tenant's data is isolated and remains invisible to other tenants.

Figure 3D:
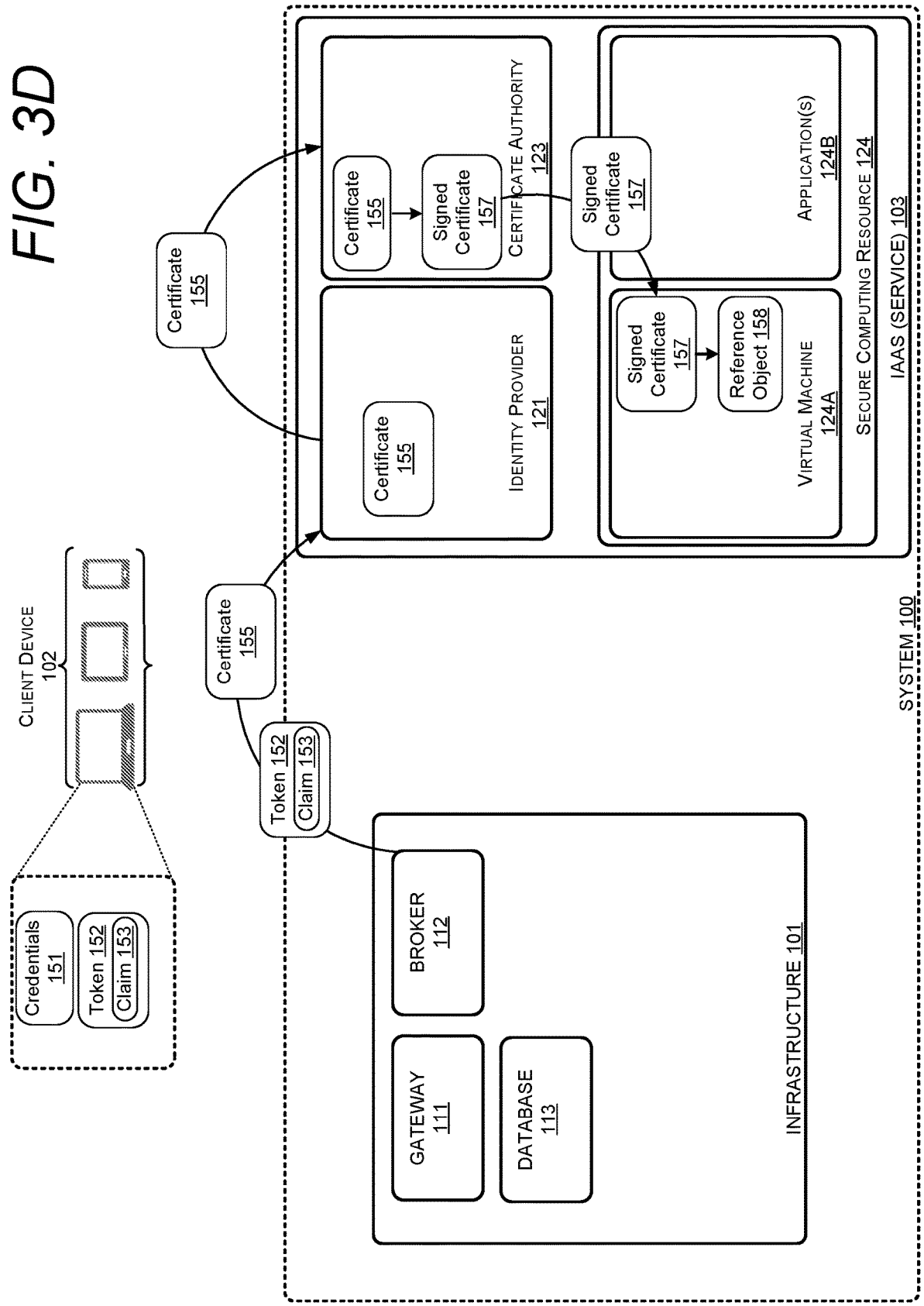
FIG. 3D illustrates aspects of a system for a single sign-on flow using a reference object for secure computing resources in a fourth state of a process of the single sign-on flow of an authentication system.

Referring now to FIG. 3D, in a fourth stage of a single sign-on process, causing the broker 112 to send the certificate 155 to an identity provider 121, causing the identity provider 121 to verify the token 152 and to send the certificate 155 to a certificate authority 123 to generate a signed certificate 157 from the certificate 155, wherein the certificate authority 123 comprises security data provided by the user to sign the certificate 155. In an implementation, the broker 112 communicates the certificate 155, the token 152, and the claim 153 to the identity provider 121. The identity provider 121 can be predetermined by the customer. The identity provider 121 can also register the identity provider 121 to be able to request a signed certificate on behalf of a user ID based on a token 152.

In an implementation, the identity provider 121 validates the token 152. Upon successful validation of the token 152, the certificate 155 is communicated to a certificate authority 123. The certificate authority 123 validates the certificate 155 and generates a signed certificate 157. The signed certificate 157 is communicated to the secure computing resource 124.

The fourth stage can also include causing communication of the signed certificate 157 to the secure computing resource 124 causing the secure computing resource 124 to generate a reference object 158 configured to provide access to the secure computing resource 124. Upon receiving the signed certificate 157, the secure computing resource 124 generates a reference object 158 based on the signed certificate 157. The reference object 158 is an identifier for the signed certificate 157. In some implementations, the reference object 158 can include the serial number of the signed certificate 157. The reference object 158 is used to locate the signed certificate 157 of the secure computing resource 124.

Figure 3E:
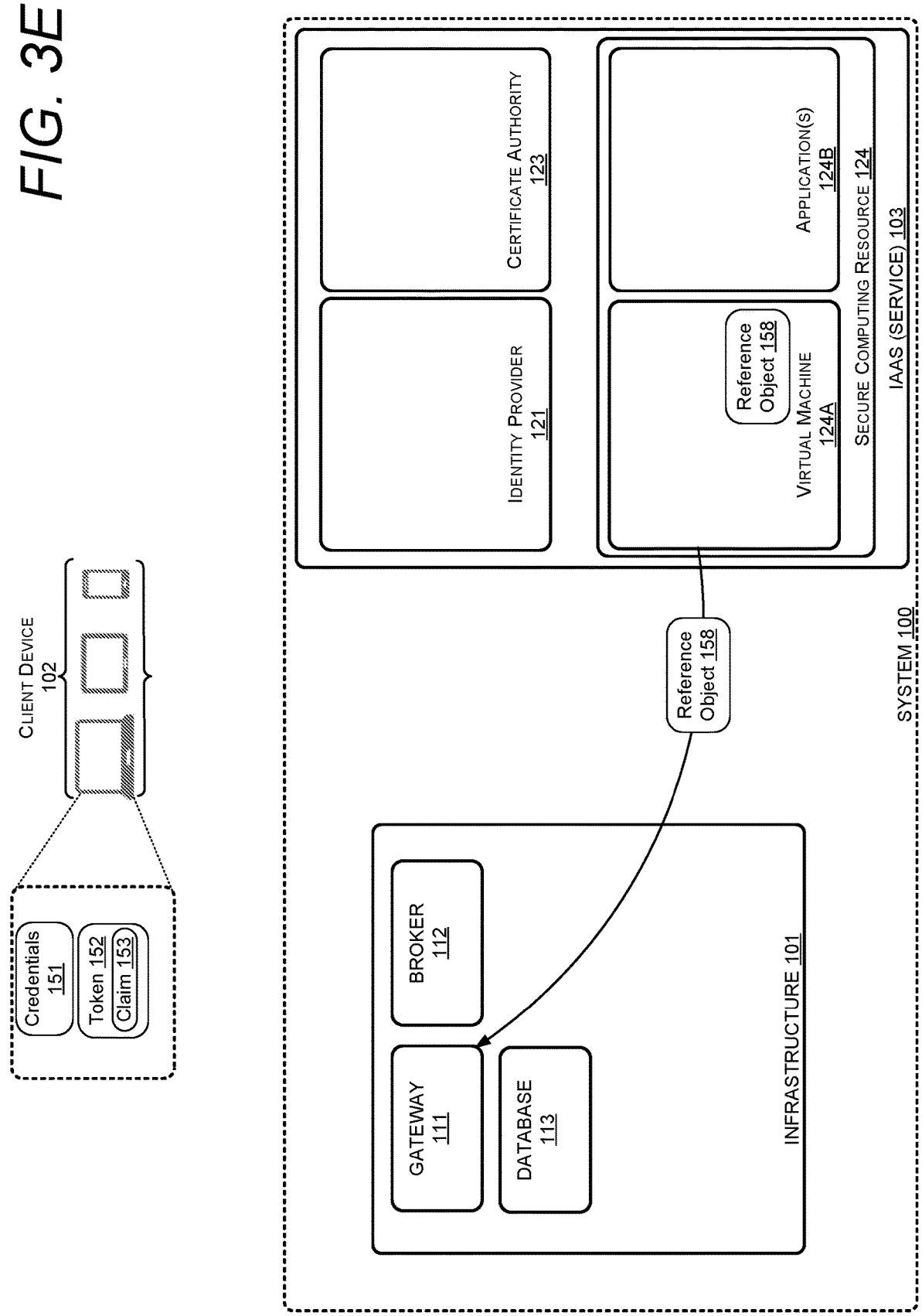
FIG. 3E illustrates aspects of a system for a single sign-on flow using a reference object for secure computing resources in a fifth state of a process of the single sign-on flow of an authentication system.

Referring now to FIG. 3E, in a fifth stage of a single sign-on process, causing communication of the reference object 158 to a gateway 111. In an implementation, the reference object 158 is communicated to the gateway 111.

Figure 3F:
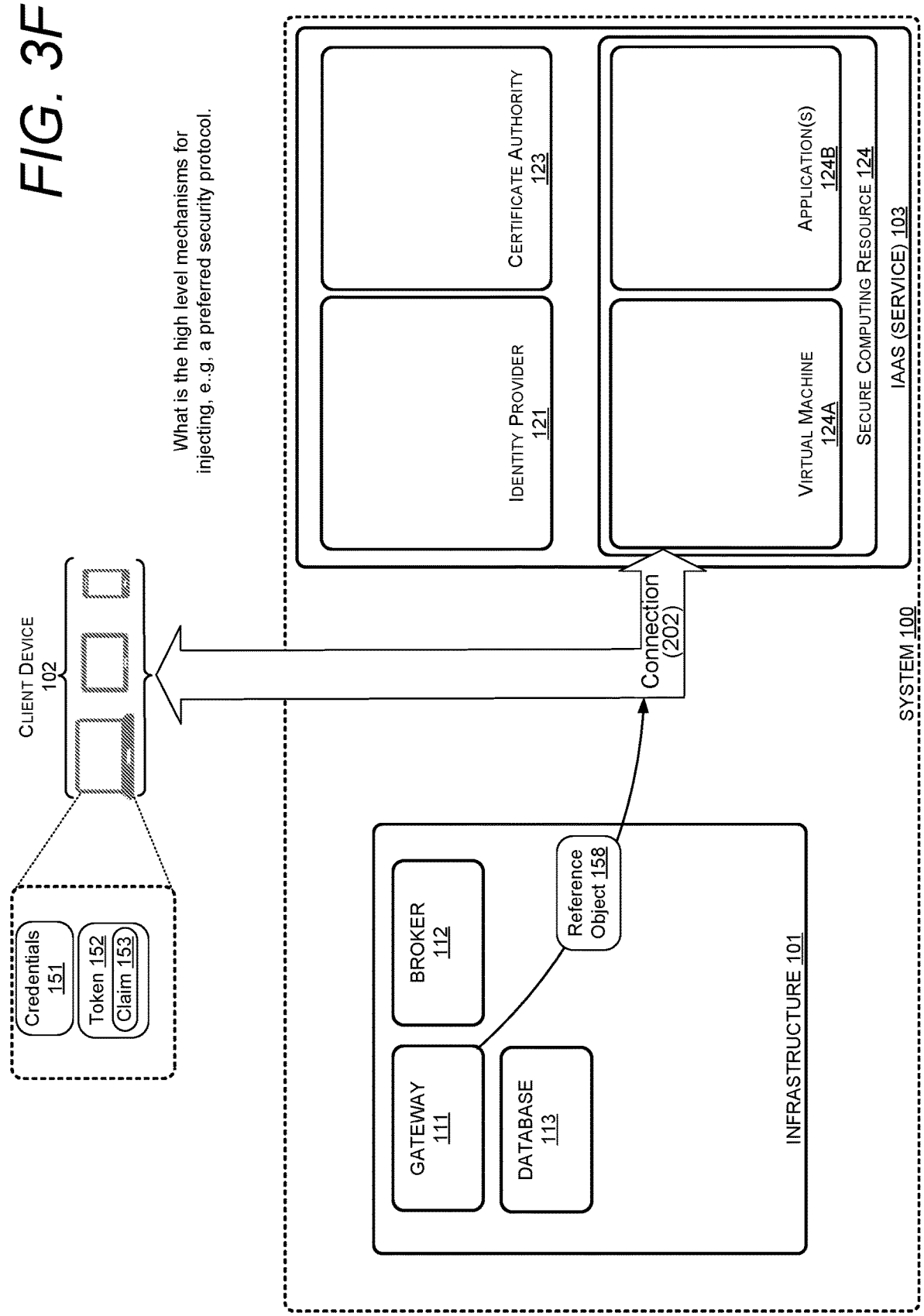
FIG. 3F illustrates aspects of a system for a single sign-on flow using a reference object for secure computing resources in a sixth state of a process of the single sign-on flow of an authentication system.

Referring now to FIG. 3F, in a sixth stage of a single sign-on process, wherein the gateway 111 is configured to insert the reference object 158 into a connection 202 between the client device 102 and the secure computing resource 124 enabling access to the secure computing resource 124 without requiring the user to provide the set of credentials 151 for access to the secure computing resource 124, wherein insertion of the reference object 158 causes communication of the reference object 158 to the secure computing resource 124 for verification of the reference object 158. The connection 202 is a communication between the secure computing resource 124 and the client device 102. For example, the connection 202 can be a secure encrypted connection using a remote desktop protocol over https.

The gateway 111 can establish a connection 202 between the client device 102 and the secure computing resource 124. The reference object 158 is inserted into the connection 202. The insertion of the reference object 158 into the connection 202 enables the client device 102 to use reference object 158 to access the secure computing resource 124 through the connection 202 without requiring the client device 102 to resubmit the credentials 151 for accessing the secure computing resource 124.

Figure 4:
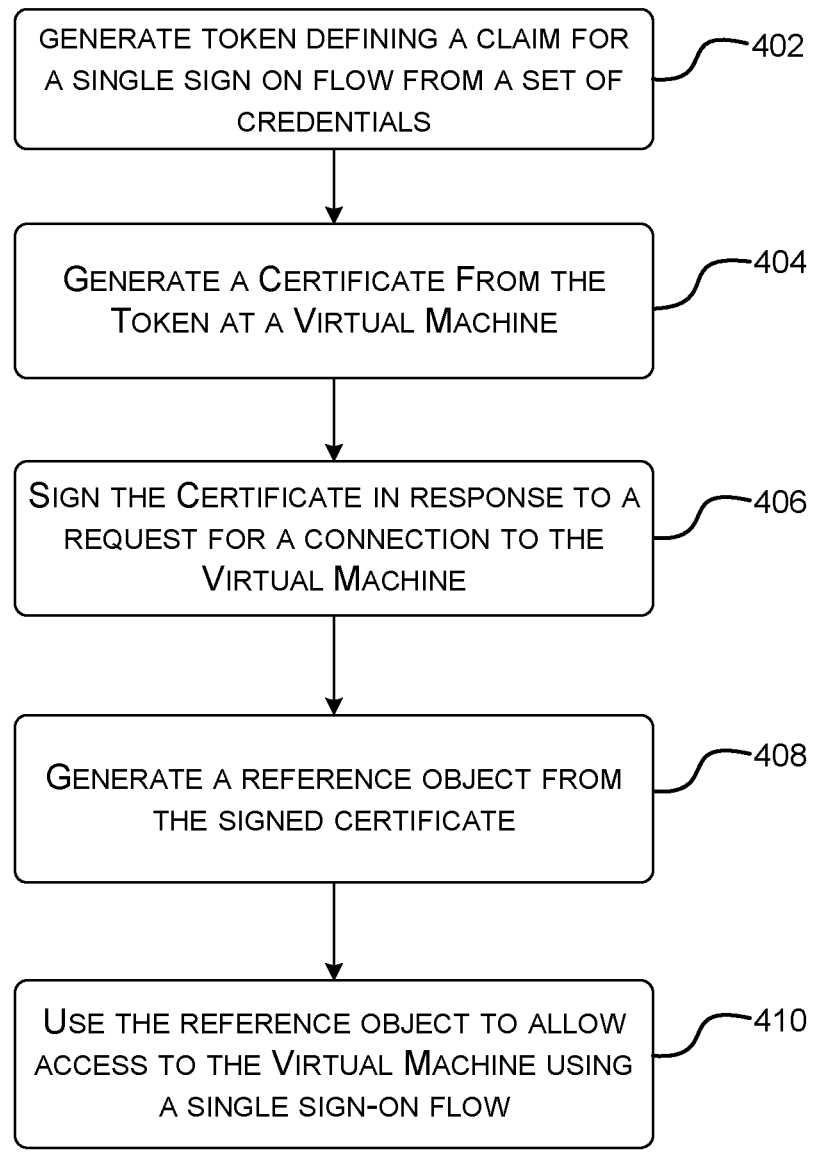
FIG. 4 is a flow diagram showing aspects of a routine for enabling the techniques disclosed herein.

Turning now to FIG. 4, aspects of a routine 400 for providing single sign-on flow access to secure computing resources are shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 4, the routine 400 begins at operation 402 where the identity provider 121 generates a token 152 defining a claim 153 for a single sign on flow from credentials 151. Operation 402 can involve receiving, at an identity provider 121, a set of credentials 151 from a client device 102. The identity provider 121 generates a token 152 indicating validity of the set of credentials 151 in response to determining that the set of credentials 151 meets one or more criteria. The token 152 defines a claim 153 for a single sign-on flow for a user associated with the set of credentials 151.

In an implementation, the identity provider 121 can generate a token 152 and a claim 153 associated with the credentials 151. The claim 153 is included within the token 152. A token 152 can be an alphanumeric string used in token-based authentication.

Next, at operation 404, where a virtual machine 124A generates a certificate 155 from the token 152 at the virtual machine 124A. Operation 404 can involve determining that a request 154 including a token 152 and a claim 153 generated by the identity provider 121, causes the virtual machine 124A to generate a certificate 155 from the token 152.

In an implementation, the request 154 through a broker 112 causes the virtual machine 124A to generate a certificate 155 based on the claim 153. The claim 153 can provide an entity of the certificate 155. The certificate 155 can provide identifying information about an entity. For example, the certificate 155 can provide information that the entity is a username or a username and password from the credentials 151.

Next, at operation 406, where a certificate authority 123 signs the certificate 155 in response to a request for a connection to the virtual machine 124A. Operation 406 can involve, in response to a request for a connection to the virtual machine 124A, causing the broker 112 to send the certificate 155 to an identity provider 121, causing the identity provider 121 to verify the token 152 and to send the certificate 155 to a certificate authority 123 to generate a signed certificate 157 from the certificate 155.

In an implementation, the identity provider 121 validates the token 152. Upon successful validation of the token 152, the certificate 155 is communicated to a certificate authority 123. The certificate authority 123 validates the certificate 155 and generates a signed certificate 157. The signed certificate 157 is communicated to the virtual machine 124A.

Next, at operation 408, where the virtual machine 124A generates a reference object 158 from the signed certificate 157. Operation 408 can involve causing the virtual machine 124A to generate a reference object 158 configured to provide access to the virtual machine 124A. Upon receiving the signed certificate 157, the virtual machine 124A generates a reference object 158 based on the signed certificate 157. The reference object 158 is an identifier for the signed certificate 157.

In some implementations, the reference object 158 can include the serial number of the signed certificate 157. The reference object 158 is used to locate the signed certificate 157 of the virtual machine 124A.

Next, at operation 410, where using the connection 202, use the reference object 158 to allow access to the virtual machine 124A using a single sign-on flow. Operation 410 can involve causing communication of the reference object 158 to a gateway 111.

In an implementation, the reference object 158 is communicated to the gateway 111. The gateway 111 is configured to insert the reference object 158 into a connection 202 between the client device 102 and the virtual machine 124A enabling access to the virtual machine 124A without requiring the user to provide the set of credentials 151 for access to the virtual machine 124A. Insertion of the reference object 158 causes communication of the reference object 158 to the virtual machine 124A for verification of the reference object 158. The connection 202 is a communication between the virtual machine 124A and the client device 102. For example, the connection 202 can be a secure encrypted connection using a remote desktop protocol over https.

Figure 5:
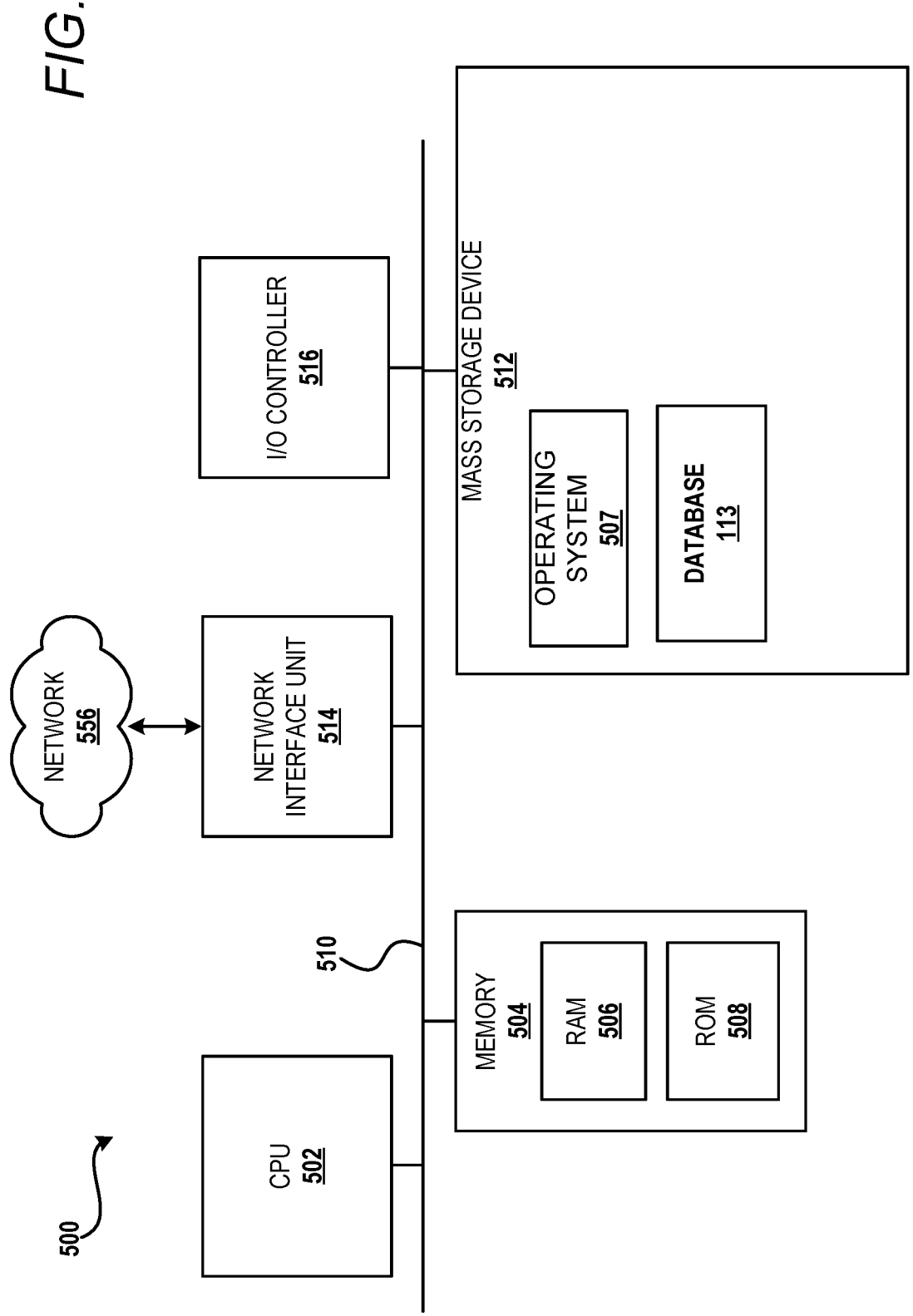
FIG. 5 is a computer architecture diagram illustrating an illustrative computer hardware and software architecture for a computing system capable of implementing aspects of the techniques and technologies presented herein.

FIG. 5 shows details of an example computer architecture 500 for a computer capable of executing the program components described herein. Thus, the computer architecture 500 illustrated in FIG. 5 illustrates an architecture for a server computer, a mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random-access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 507, other data, and one or more applications. The mass storage device 512 can also store other items such as a database 113.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media or a computer storage medium may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computer architecture 800. For purposes of the claims, the phrase "non-transitory computer storage medium," "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Figure 6:
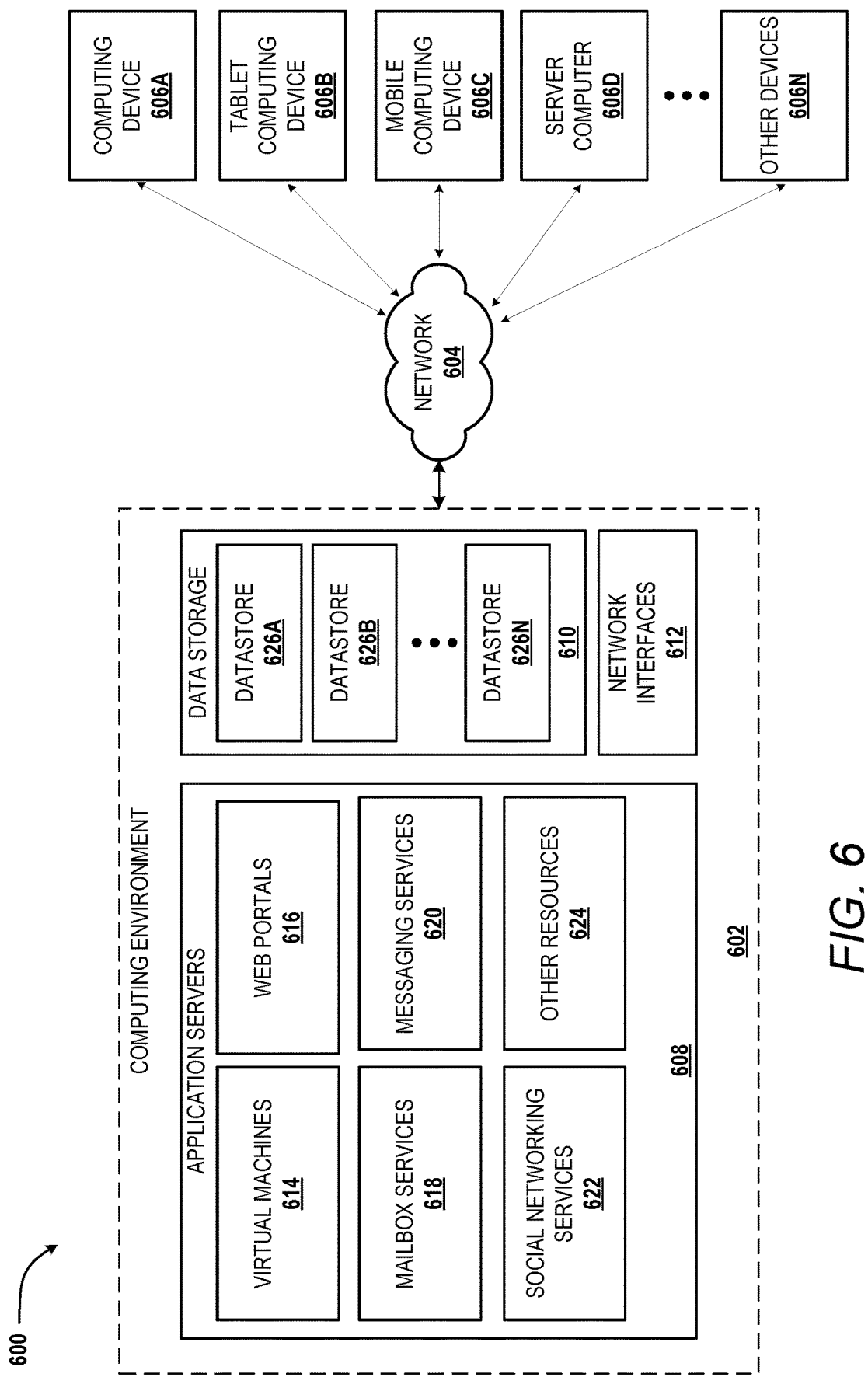
FIG. 6 is a diagram illustrating a distributed computing environment capable of implementing aspects of the techniques and technologies presented herein.

FIG. 6 depicts an illustrative distributed computing environment 600 capable of executing the software components described herein. Thus, the distributed computing environment 600 illustrated in FIG. 6 can be utilized to execute any aspects of the software components presented herein. For example, the distributed computing environment 600 can be utilized to execute aspects of the software components described herein.

According to various implementations, the distributed computing environment 600 includes a computing environment 602 operating on, in communication with, or as part of the network 604. The network 604 may be or may include the network 556, described above with reference to FIG. 5. The network 604 also can include various access networks. One or more client devices 606A-606N (hereinafter referred to collectively and/or generically as "clients 606" and also referred to herein as computing devices) can communicate with the computing environment 602 via the network 604 and/or other connections (not illustrated in FIG. 5). In one illustrated configuration, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602. Two example computing architectures for the clients 606 are illustrated and described herein with reference to FIGS. 5 and 6. It should be understood that the illustrated clients 606 and computing architectures illustrated and described herein are illustrative and should not be construed as being limited in any way.

In the illustrated configuration, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated configuration, the application servers 608 host one or more virtual machines 614 for hosting applications or other functionality. According to various implementations, the virtual machines 614 host one or more applications and/or software modules for enabling efficient testing disclosed herein. It should be understood that this configuration is illustrative and should not be construed as being limiting in any way. The application servers 608 also host or provide access to one or more portals, link pages, Web sites, and/or other information ("Web portals") 616.

According to various implementations, the application servers 608 also include one or more mailbox services 618 and one or more messaging services 620. The mailbox services 618 can include electronic mail ("email") services. The mailbox services 618 also can include various personal information management ("PIM") and presence services including, but not limited to, calendar services, contact management services, collaboration services, and/or other services. The messaging services 620 can include, but are not limited to, instant messaging services, chat services, forum services, and/or other communication services.

The application servers 608 also may include one or more social networking services 622. The social networking services 622 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 622 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 622 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Washington Other services are possible and are contemplated.

The social networking services 622 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 622 are not mentioned herein for the sake of brevity. As such, the above configurations are illustrative, and should not be construed as being limited in any way. According to various implementations, the social networking services 622 may host one or more applications and/or software modules for providing the functionality described herein. For instance, any one of the application servers 608 may communicate or facilitate the functionality and features described herein. For instance, a social networking application, mail client, messaging client or a browser running on a phone or any other client 606 may communicate with a networking service 622 and facilitate the functionality, even in part, described above with respect to FIG. 6. Any device or service depicted herein can be used as a resource for supplemental data, including email servers, storage servers, etc.

As shown in FIG. 6, the application servers 608 also can host other services, applications, portals, and/or other resources ("other resources") 624. The other resources 624 can include, but are not limited to, document sharing, rendering or any other functionality. It thus can be appreciated that the computing environment 602 can provide integration of the concepts and technologies disclosed herein with various mailbox, messaging, social networking, and/or other services or resources.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more server computers configured to host data for the computing environment 602. The data storage 610 can include, host, or provide one or more real or virtual datastores 626A-626N (hereinafter referred to collectively and/or generically as "datastores 626"). The datastores 626 are configured to host data used or created by the application servers 608 and/or other data. Although not illustrated in FIG. 6, the datastores 626 also can host or store web page documents, word documents, presentation documents, data structures, algorithms for execution by a recommendation engine, and/or other data utilized by any application program or another module. Aspects of the datastores 626 may be associated with a service for storing files.

The computing environment 602 can communicate with, or be accessed by, the network interfaces 612. The network interfaces 612 can include various types of network hardware and software for supporting communications between two or more computing devices including, but not limited to, the computing devices and the servers. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 600 to utilize the functionality described herein for providing the techniques disclosed herein, among other aspects. In one specific example, as summarized above, techniques described herein may be implemented, at least in part, by web browser application, which works in conjunction with the application servers 608 of FIG. 6.

Turning now to FIG. 7, an illustrative computing device architecture 700 for a computing device that is capable of executing various software components described herein for enabling the techniques disclosed herein. The computing device architecture 700 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 700 is applicable to any of the computing devices shown in FIG. 1 and FIG. 6. Moreover, aspects of the computing device architecture 700 may be applicable to traditional desktop computers, portable computers (e.g., phones, laptops, notebooks, ultra-portables, and netbooks), server computers, and other computer systems, such as described herein with reference to FIG. 1 and FIG. 6. For example, the single touch and multi-touch aspects disclosed herein below may be applied to desktop computers that utilize a touchscreen or some other touch-enabled device, such as a touch-enabled track pad or touch-enabled mouse.

The computing device architecture 700 illustrated in FIG. 7 includes a processor 702, memory components 704, network connectivity components 706, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individuals components illustrated in FIG. 12, the components can interact to carry out device functions. In some configurations, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, a touch-enabled input.

In some configurations, the processor 702 includes a graphics processing unit ("GPU") configured to accelerate operations performed by the CPU, including, but not limited to, operations performed by executing general-purpose scientific and/or engineering computing applications, as well as graphics-intensive computing applications such as high-resolution video (e.g., 720P, 1080P, and higher resolution), video games, three-dimensional ("3D") modeling applications, and the like. In some configurations, the processor 702 is configured to communicate with a discrete GPU (not shown). In any case, the CPU and GPU may be configured in accordance with a co-processing CPU/GPU computing model, wherein the sequential part of an application executes on the CPU and the computationally intensive part is accelerated by the GPU.

In some configurations, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some configurations, the processor 702 is fabricated, in part, utilizing a package-on-package ("PoP") integrated circuit packaging technique. The processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, California and others. In some configurations, the processor 702 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 704 include a random-access memory ("RAM") 714, a read-only memory ("ROM") 716, an integrated storage memory ("integrated storage") 718, and a removable storage memory ("removable storage") 720. In some configurations, the RAM 714 or a portion thereof, the ROM 716 or a portion thereof, and/or some combination of the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 and/or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available as a total combined storage capacity. In some configurations, the total combined capacity of the integrated storage 718 and the removable storage 720 is shown to a user instead of separate storage capacities for the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system includes, but is not limited to WINDOWS MOBILE OS from Microsoft Corporation of Redmond, Washington, WINDOWS PHONE OS from Microsoft Corporation, WINDOWS from Microsoft Corporation, PALM WEBOS from Hewlett-Packard Company of Palo Alto, California, BLACKBERRY OS from Research In Motion Limited of Waterloo, Ontario, Canada, IOS from Apple Inc. of Cupertino, California, and ANDROID OS from Google Inc. of Mountain View, California Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from the network 756 or another network, which may be a WWAN, a WLAN, or a WPAN. Although only the network 756 is illustrated, the network connectivity components 706 may facilitate simultaneous communication with multiple networks, including the network 656 of FIG. 6. For example, the network connectivity components 706 may facilitate simultaneous communications with multiple networks via one or more of a WWAN, a WLAN, or a WPAN.

The network 756 may be or may include a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 756 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 756 may be configured to provide voice and/or data communications with any combination of the above technologies. The network 756 may be configured to or adapted to provide voice and/or data communications in accordance with future generation technologies.

In some configurations, the WWAN component 722 is configured to provide dual-multi-mode connectivity to the network 756. For example, the WWAN component 722 may be configured to provide connectivity to the network 756, wherein the network 756 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 756 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 756 via the WI-FI access points. Such connections may be secured via various encryption technologies including, but not limited, WI-FI Protected Access ("WPA"), WPA2, Wired Equivalent Privacy ("WEP"), and the like.

The network 756 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 728, an ambient light sensor 730, a proximity sensor 732, an accelerometer 734, a gyroscope 736, and a Global Positioning System sensor ("GPS sensor") 738. It is contemplated that other sensors, such as, but not limited to, temperature sensors or shock detection sensors, also may be incorporated in the computing device architecture 700.

The magnetometer 728 is configured to measure the strength and direction of a magnetic field. In some configurations the magnetometer 728 provides measurements to a compass application program stored within one of the memory components 704 in order to provide a user with accurate directions in a frame of reference including the cardinal directions, north, south, east, and west. Similar measurements may be provided to a navigation application program that includes a compass component. Other uses of measurements obtained by the magnetometer 728 are contemplated.

The ambient light sensor 730 is configured to measure ambient light. In some configurations, the ambient light sensor 730 provides measurements to an application program stored within one the memory components 704 in order to automatically adjust the brightness of a display (described below) to compensate for low-light and high-light environments. Other uses of measurements obtained by the ambient light sensor 730 are contemplated.

The proximity sensor 732 is configured to detect the presence of an object or thing in proximity to the computing device without direct contact. In some configurations, the proximity sensor 732 detects the presence of a user's body (e.g., the user's face) and provides this information to an application program stored within one of the memory components 704 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 732 are contemplated.

The accelerometer 734 is configured to measure proper acceleration. In some configurations, output from the accelerometer 734 is used by an application program as an input mechanism to control some functionality of the application program. For example, the application program may be a video game in which a character, a portion thereof, or an object is moved or otherwise manipulated in response to input received via the accelerometer 734. In some configurations, output from the accelerometer 734 is provided to an application program for use in switching between landscape and portrait modes, calculating coordinate acceleration, or detecting a fall. Other uses of the accelerometer 734 are contemplated.

The gyroscope 736 is configured to measure and maintain orientation. In some configurations, output from the gyroscope 736 is used by an application program as an input mechanism to control some functionality of the application program. For example, the gyroscope 736 can be used for accurate recognition of movement within a 3D environment of a video game application or some other application. In some configurations, an application program utilizes output from the gyroscope 736 and the accelerometer 734 to enhance control of some functionality of the application program. Other uses of the gyroscope 736 are contemplated.

The GPS sensor 738 is configured to receive signals from GPS satellites for use in calculating a location. The location calculated by the GPS sensor 738 may be used by any application program that requires or benefits from location information. For example, the location calculated by the GPS sensor 738 may be used with a navigation application program to provide directions from the location to a destination or directions from the destination to the location. Moreover, the GPS sensor 738 may be used to provide location information to an external location-based service, such as E911 service. The GPS sensor 738 may obtain location information generated via WI-FI, WIMAX, and/or cellular triangulation techniques utilizing one or more of the network connectivity components 706 to aid the GPS sensor 738 in obtaining a location fix. The GPS sensor 738 may also be used in Assisted GPS ("A-GPS") systems. The GPS sensor 738 can also operate in conjunction with other components, such as the processor 702, to generate positioning data for the computing device 700.

The I/O components 710 include a display 740, a touchscreen 742, a data I/O interface component ("data I/O") 744, an audio I/O interface component ("audio I/O") 746, a video I/O interface component ("video I/O") 748, and a camera

750. In some configurations, the display 740 and the touchscreen 742 are combined. In some configurations two or more of the data I/O component 744, the audio I/O component 746, and the video I/O component 748 are combined. The I/O components 710 may include discrete processors configured to support the various interface described below, or may include processing functionality built-in to the processor 702.

The display 740 is an output device configured to present information in a visual form. In particular, the display 740 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 740 is a liquid crystal display ("LCD") utilizing any active or passive matrix technology and any backlighting technology (if used). In some configurations, the display 740 is an organic light emitting diode ("OLED") display. Other display types are contemplated.

The touchscreen 742, also referred to herein as a "touch-enabled screen," is an input device configured to detect the presence and location of a touch. The touchscreen 742 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 742 is incorporated on top of the display 740 as a transparent layer to enable a user to use one or more touches to interact with objects or other information presented on the display 740. In other configurations, the touchscreen 742 is a touch pad incorporated on a surface of the computing device that does not include the display 740. For example, the computing device may have a touchscreen incorporated on top of the display 740 and a touch pad on a surface opposite the display 740.

In some configurations, the touchscreen 742 is a single-touch touchscreen. In other configurations, the touchscreen 742 is a multi-touch touchscreen. In some configurations, the touchscreen 742 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 742. As such, a developer may create gestures that are specific to a particular application program.

In some configurations, the touchscreen 742 supports a tap gesture in which a user taps the touchscreen 742 once on an item presented on the display 740. The tap gesture may be used for various reasons including, but not limited to, opening or launching whatever the user taps. In some configurations, the touchscreen 742 supports a double tap gesture in which a user taps the touchscreen 742 twice on an item presented on the display 740. The double tap gesture may be used for various reasons including, but not limited to, zooming in or zooming out in stages. In some configurations, the touchscreen 742 supports a tap and hold gesture in which a user taps the touchscreen 742 and maintains contact for at least a pre-defined time. The tap and hold gesture may be used for various reasons including, but not limited to, opening a context-specific menu.

In some configurations, the touchscreen 742 supports a pan gesture in which a user places a finger on the touchscreen 742 and maintains contact with the touchscreen 742 while moving the finger on the touchscreen 742. The pan gesture may be used for various reasons including, but not limited to, moving through screens, images, or menus at a controlled rate. Multiple finger pan gestures are also contemplated. In some configurations, the touchscreen 742 supports a flick gesture in which a user swipes a finger in the direction the user wants the screen to move. The flick gesture may be used for various reasons including, but not limited to, scrolling horizontally or vertically through menus or pages. In some configurations, the touchscreen 742 supports a pinch and stretch gesture in which a user makes a pinching motion with two fingers (e.g., thumb and forefinger) on the touchscreen 742 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 742. As such, the above gestures should be understood as being illustrative and should not be construed as being limiting in any way.

The data I/O interface component 744 is configured to facilitate input of data to the computing device and output of data from the computing device. In some configurations, the data I/O interface component 744 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 746 is configured to provide audio input and/or output capabilities to the computing device. In some configurations, the audio I/O interface component 746 includes a microphone configured to collect audio signals. In some configurations, the audio I/O interface component 746 includes a headphone jack configured to provide connectivity for headphones or other external speakers. In some configurations, the audio I/O interface component 746 includes a speaker for the output of audio signals. In some configurations, the audio I/O interface component 746 includes an optical audio cable out.

The video I/O interface component 748 is configured to provide video input and/or output capabilities to the computing device. In some configurations, the video I/O interface component 748 includes a video connector configured to receive video as input from another device (e.g., a video media player such as a DVD or BLURAY player) or send video as output to another device (e.g., a monitor, a television, or some other external display). In some configurations, the video I/O interface component 748 includes a High-Definition Multimedia Interface ("HDMI"), mini-HDMI, micro-HDMI, DisplayPort, or proprietary connector to input/output video content. In some configurations, the video I/O interface component 748 or portions thereof is combined with the audio I/O interface component 746 or portions thereof.

The camera 750 can be configured to capture still images and/or video. The camera 750 may utilize a charge coupled device ("CCD") or a complementary metal oxide semiconductor ("CMOS") image sensor to capture images. In some configurations, the camera 750 includes a flash to aid in taking pictures in low-light environments. Settings for the camera 750 may be implemented as hardware or software buttons.

Although not illustrated, one or more hardware buttons may also be included in the computing device architecture 700. The hardware buttons may be used for controlling some operational aspect of the computing device. The hardware buttons may be dedicated buttons or multi-use buttons. The hardware buttons may be mechanical or sensor-based.

The illustrated power components 712 include one or more batteries 752, which can be connected to a battery gauge 754. The batteries 752 may be rechargeable or disposable. Rechargeable battery types include, but are not limited to, lithium polymer, lithium ion, nickel cadmium, and nickel metal hydride. Each of the batteries 752 may be made of one or more cells.

The battery gauge 754 can be configured to measure battery parameters such as current, voltage, and temperature. In some configurations, the battery gauge 754 is configured to measure the effect of a battery's discharge rate, temperature, age and other factors to predict remaining life within a certain percentage of error. In some configurations, the battery gauge 754 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 712 may also include a power connector, which may be combined with one or more of the aforementioned I/O components 710. The power components 712 may interface with an external power system or charging equipment via an I/O component.

The following clauses are to supplement the present disclosure.

Example Clause 1. A method for execution on a computing system, the method comprising: receiving, at an identity provider, a set of credentials from a client device; generating a token indicating validity of the set of credentials in response to determining that the set of credentials meets one or more criteria, the token defining a claim for a single sign-on flow for a user associated with the set of credentials; communicating the token to the client device, wherein the client device is configured to communicate the token with a request to initiate the single sign-on flow for accessing a secure computing resource of a service; receiving, at a broker, the request from the client device for access to the secure computing resource of the service, wherein the request comprises the token that defines the claim for the single sign-on flow; in response to determining that the request comprises the token and the claim generated by the identity provider, causing the secure computing resource to generate a certificate from the token, wherein the secure computing resource is configured to communicate the certificate and the token to the identity provider; causing the identity provider to verify the token and to send the certificate to a certificate authority to generate a signed certificate from the certificate, wherein the certificate authority comprises security data provided by the user to sign the certificate; and sending the signed certificate to the secure computing resource, where the signed certificate enables client device to access the secure computing resource through a connection without requiring the client device to resubmit the set of credentials for accessing the secure computing resource.

Example Clause 2. The method of clause 1, wherein receiving, at the identity provider, the set of credentials from the client device, causing the set of credentials to log into the identity provider, causing the token to be generated, where when the token returns to the identity provider, the identity provider initiates exchanging the token for the certificate.

Example Clause 3. The method of clause 1, wherein the secure computing resource is a remote virtual machine, virtual machine, a container, or a data store.

Example Clause 4. The method of clause 1, wherein the token is sent to the secure computing resource that is registered to a user associated with the credentials.

Example Clause 5. The method of clause 1, wherein causing the secure computing resource to generate the certificate from the token by communicating the token from the broker to the secure computing resource, where receipt of the token at the secure computing resource causes the generation of the certificate at the secure computing resource.

Example Clause 6. The method of clause 5, wherein the certificate includes a username and a password from the credentials, wherein the certificate authority validates the username and the password from the credentials.

Example Clause 7. The method of clause 1, wherein the certificate is routed to the certificate authority based on an address provided by a configuration file established by the user configurating security settings.

Example Clause 8. The method of clause 1, wherein the certificate and the signed certificate are deleted at a predetermined time after the signed certificate enables access to the secure computing resource.

Example Clause 9. A method for execution on a computing system, the method comprising: receiving, at an identity provider, a set of credentials from a client device; generating a token indicating validity of the set of credentials in response to determining that the set of credentials meets one or more criteria, the token defining a claim for a single sign-on flow for a user associated with the set of credentials; communicating the token to the client device, wherein the client device is configured to communicate the token with a request to initiate the single sign-on flow for accessing a secure computing resource of a service; receiving, at a broker, the request from the client device for access to the secure computing resource of the service, wherein the request comprises the token that defines the claim for the single sign-on flow; in response to determining that the request comprises the token and the claim generated by the identity provider, causing the secure computing resource to generate a certificate from the token, wherein the secure computing resource is configured to communicate the certificate to a broker; causing the broker to send the certificate to an identity provider, causing the identity provider to verify the token and to send the certificate to a certificate authority to generate a signed certificate from the certificate, wherein the certificate authority comprises security data provided by the user to sign the certificate; causing communication of the signed certificate to the secure computing resource causing the secure computing resource to generate a reference object configured to provide access to the secure computing resource; and causing communication of the reference object to a gateway, wherein the gateway is configured to insert the reference object into a connection between the client device and the secure computing resource enabling access to the secure computing resource without requiring the user to provide the set of credentials for access to the secure computing resource, wherein insertion of the reference object causes communication of the reference object to the secure computing resource for verification of the reference object.

Example Clause 10. The method of clause 9, wherein receiving, at the identity provider, the set of credentials from the client device, causing the set of credentials to log into the identity provider, causing the token to be generated, where when the token returns to the identity provider, the identity provider initiates exchanging the token for the certificate.

Example Clause 11. The method of clause 9, wherein the secure computing resource is a remote virtual machine, Virtual machine, a container, or a data store.

Example Clause 12. The method of clause 9, wherein the token is sent to the secure computing resource that is registered to a user associated with the credentials.

Example Clause 13. The method of clause 9, wherein causing the secure computing resource to generate the certificate from the token by communicating the token from the broker to the secure computing resource, where receipt of the token at the secure computing resource causes the generation of the certificate at the secure computing resource.

Example Clause 14. The method of clause 9, wherein the certificate is routed to the certificate authority based on an address provided by a configuration file established by the user configurating security settings.

Example Clause 15. The method of clause 9, wherein the certificate and the signed certificate are deleted at a predetermined time after the signed certificate enables access to the secure computing resource.

Example Clause 16. A computer-readable storage medium having encoded thereon computer-executable instructions to cause one or more processing units of a system to: receive, at an identity provider, a set of credentials from a client device; generate a token indicating validity of the set of credentials in response to determining that the set of credentials meets one or more criteria, the token defining a claim for a single sign-on flow for a user associated with the set of credentials; communicate the token to the client device, wherein the client device is configured to communicate the token with a request to initiate the single sign-on flow for accessing a secure computing resource of a service; receive, at a broker, the request from the client device for access to the secure computing resource of the service, wherein the request comprises the token that defines the claim for the single sign-on flow; in response to determining that the request comprises the token and the claim generated by the identity provider, cause the secure computing resource to generate a certificate from the token, wherein the secure computing resource is configured to communicate the certificate and the token to the identity provider; cause the identity provider to verify the token and send the certificate to a certificate authority to generate a signed certificate from the certificate, wherein the certificate authority comprises security data provided by the user to sign the certificate; and send the signed certificate to the secure computing resource, where the signed certificate enables the client device to access to the secure computing resource through a connection without requiring the user to resubmit the set of credentials for access to the secure computing resource.

Example Clause 17. The computer-readable storage medium of clause 16, wherein receive, at the identity provider, the set of credentials from the client device, cause the set of credentials to log into the identity provider, cause the token to be generated, where when the token returns to the identity provider, the identity provider initiates exchanging the token for the certificate. first disclosure meeting.

Example Clause 18. The computer-readable storage medium of clause 16, wherein the secure computing resource is a remote virtual machine, Virtual machine, a container, or a data store.

Example Clause 19. The computer-readable storage medium of clause 16, wherein the token is sent to the secure computing resource that is registered to a user associated with the credentials.

Example Clause 20. The computer-readable storage medium of clause 16, wherein cause the secure computing resource to generate the certificate from the token by communicating the token from the broker to the secure computing resource, where receipt of the token at the secure computing resource causes the generation of the certificate at the secure computing resource.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for execution on a computing system, the method comprising:
   receiving, at an identity provider executing on the computing system, a set of credentials from a client device, wherein the client device is separate from the computing system;
   generating, at the identity provider, a token indicating validity of the set of credentials in response to determining that the set of credentials meets one or more criteria, the token defining a claim for a single sign-on flow for a user associated with the set of credentials;
   communicating the token to the client device from the computing system, wherein the client device is configured to communicate the token with a request to a broker to initiate the single sign-on flow for accessing a secure computing resource of a service executing at the computing system;
   receiving, at the broker, the request from the client device for access to the secure computing resource of the service, wherein the request comprises the token that defines the claim for the single sign-on flow for the user associated with the set of credentials;
   in response to determining that the request comprises the token and the claim generated by the identity provider, causing the secure computing resource at the service to generate an unsigned certificate from the token, wherein the secure computing resource is configured to communicate the unsigned certificate and the token defining the claim to the identity provider;
   causing the identity provider at the secure computing resource to verify the token and to send the unsigned certificate to a certificate authority at the secure computing resource to generate a signed certificate from the unsigned certificate, wherein the certificate authority comprises security data provided by the user to sign the unsigned certificate; and
   sending the signed certificate to the secure computing resource, where the signed certificate enables the client device to access the secure computing resource through a connection without requiring the client device to resubmit the set of credentials, and without requiring the secure computing resource to generate another unsigned certificate for accessing the secure computing resource.

2. The method of claim 1, wherein receiving, at the identity provider, the set of credentials from the client device, causing the set of credentials to log into the identity provider, causing the token to be generated, where when the token returns to the identity provider, the identity provider initiates exchanging the token for the certificate.

3. The method of claim 1, wherein the secure computing resource is a remote virtual machine, virtual machine, a container, or a data store.

4. The method of claim 1, wherein the token is sent to the secure computing resource that is registered to a user associated with the credentials.

5. The method of claim 1, wherein causing the secure computing resource to generate the certificate from the token by communicating the token from the broker to the secure computing resource, where receipt of the token at the secure computing resource causes the generation of the certificate at the secure computing resource.

6. The method of claim 1, wherein the certificate is routed to the certificate authority based on an address provided by a configuration file established by the user configurating security settings.

7. The method of claim 1, wherein the certificate and the signed certificate are deleted at a predetermined time after the signed certificate enables access to the secure computing resource.

8. A method for execution on a computing system, the method comprising:
  receiving, at an identity provider executing on the computing system, a set of credentials from a client device, wherein the client device is separate from the computing system;
  generating, at the identity provider, a token indicating validity of the set of credentials in response to determining that the set of credentials meets one or more criteria, the token defining a claim for a single sign-on flow for a user associated with the set of credentials;
  communicating the token to the client device from the computing system, wherein the client device is configured to communicate the token with a request to a broker to initiate the single sign-on flow for accessing a secure computing resource of a service executing at the computing system;
  receiving, at the broker, the request from the client device for access to the secure computing resource of the service, wherein the request comprises the token that defines the claim for the single sign-on flow for the user associated with the set of credentials;
  in response to determining that the request comprises the token and the claim generated by the identity provider, causing the secure computing resource at the service to generate an unsigned certificate from the token, wherein the secure computing resource is configured to communicate the unsigned certificate to a broker;
  causing the identity provider to verify the token and to send the unsigned certificate to a certificate authority to generate a signed certificate from the unsigned certificate, wherein the certificate authority comprises security data provided by the user to sign the unsigned certificate;
  causing communication of the signed certificate to the secure computing resource causing the secure computing resource to generate a reference object using the serial number of the signed certificate configured to provide access to the secure computing resource located at the system; and
  causing communication of the reference object to a gateway, wherein the gateway is configured to insert the reference object into a connection between the client device and the secure computing resource enabling access to the secure computing resource without requiring the user to provide the set of credentials for access to the secure computing resource, wherein insertion of the reference object causes communication of the reference object to the secure computing resource for verification of the reference object.

9. The method of claim 8, wherein receiving, at the identity provider, the set of credentials from the client device, causing the set of credentials to log into the identity provider, causing the token to be generated, where when the token returns to the identity provider, the identity provider initiates exchanging the token for the certificate.

10. The method of claim 8, wherein the secure computing resource is a remote virtual machine, Virtual machine, a container, or a data store.

11. The method of claim 8, wherein the token is sent to the secure computing resource that is registered to a user associated with the credentials.

12. The method of claim 8, wherein causing the secure computing resource to generate the certificate from the token by communicating the token from the broker to the secure computing resource, where receipt of the token at the secure computing resource causes the generation of the certificate at the secure computing resource.

13. The method of claim 8, wherein the certificate is routed to the certificate authority based on an address provided by a configuration file established by the user configurating security settings.

14. The method of claim 8, wherein the certificate and the signed certificate are deleted at a predetermined time after the signed certificate enables access to the secure computing resource.

15. A computer-readable storage medium having encoded thereon computer-executable instructions to cause one or more processing units of a system to:
  receive, at an identity provider executing on the computing system, a set of credentials from a client device, wherein the client device is separate from the computing system;
  generate, at the identity provider, a token indicating validity of the set of credentials in response to determining that the set of credentials meets one or more criteria, the token defining a claim for a single sign-on flow for a user associated with the set of credentials;
  communicate the token to the client device from the computing system, wherein the client device is configured to communicate the token with a request to initiate the single sign-on flow for accessing a secure computing resource of a service executing at the computing system;
  receive, at a broker, the request from the client device for access to the secure computing resource of the service, wherein the request comprises the token that defines the claim for the single sign-on flow for the user associated with the set of credentials;
  in response to determining that the request comprises the token and the claim generated by the identity provider, cause the secure computing resource at the service to generate an unsigned certificate from the token, wherein the secure computing resource is configured to communicate the unsigned certificate and the token defining the claim to the identity provider;

cause the identity provider at the secure computing resource to verify the token and send the unsigned certificate to a certificate authority at the secure computing resource to generate a signed certificate from the unsigned certificate, wherein the certificate authority comprises security data provided by the user to sign the unsigned certificate; and send the signed certificate to the secure computing resource, where the signed certificate enables the client device to access to the secure computing resource through a connection without requiring the user to resubmit the set of credentials, and without requiring the secure computing resource to generate another unsigned certificate for access to the secure computing resource.

16. The computer-readable storage medium of claim 15, wherein receive, at the identity provider, the set of credentials from the client device, cause the set of credentials to log into the identity provider, cause the token to be generated, where when the token returns to the identity provider, the identity provider initiates exchanging the token for the certificate, first disclosure meeting.

17. The computer-readable storage medium of claim 15, wherein the secure computing resource is a remote virtual machine, Virtual machine, a container, or a data store.

18. The computer-readable storage medium of claim 15, wherein the token is sent to the secure computing resource that is registered to a user associated with the credentials.

19. The computer-readable storage medium of claim 15, wherein cause the secure computing resource to generate the certificate from the token by communicating the token from the broker to the secure computing resource, where receipt of the token at the secure computing resource causes the generation of the certificate at the secure computing resource.

20. The method of claim 1, wherein sending the signed certificate to the secure computing resource is enabled by the validation of the token and the generation of the signed certificate from the certificate.

* * * * *